US011024083B2

(12) United States Patent
Kim et al.

(10) Patent No.: US 11,024,083 B2
(45) Date of Patent: Jun. 1, 2021

(54) SERVER, USER TERMINAL DEVICE, AND CONTROL METHOD THEREFOR

(71) Applicant: Samsung Electronics Co., Ltd., Suwon-si (KR)

(72) Inventors: Do-wan Kim, Suwon-si (KR); Ji-hwan Woo, Seoul (KR); Han-il Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/563,791

(22) PCT Filed: Dec. 3, 2015

(86) PCT No.: PCT/KR2015/013138
§ 371 (c)(1),
(2) Date: Oct. 2, 2017

(87) PCT Pub. No.: WO2016/171363
PCT Pub. Date: Oct. 27, 2016

(65) Prior Publication Data
US 2018/0068489 A1 Mar. 8, 2018

(30) Foreign Application Priority Data
Apr. 20, 2015 (KR) .......................... 10-2015-0055129

(51) Int. Cl.
*G06T 19/00* (2011.01)
*G06Q 50/00* (2012.01)
(Continued)

(52) U.S. Cl.
CPC ............ *G06T 19/006* (2013.01); *G06F 3/013* (2013.01); *G06F 3/04817* (2013.01);
(Continued)

(58) Field of Classification Search
CPC ........ G06F 3/013; G06F 3/016; G06F 3/0482; G06F 3/04817; G06F 17/3087;
(Continued)

(56) References Cited

U.S. PATENT DOCUMENTS 8,522,160 B2   8/2013  Imanishi
8,633,964 B1 * 1/2014  Zhu ...................... H04N 21/472
                                                    348/36

(Continued)

FOREIGN PATENT DOCUMENTS

CN    101848364 A    9/2010
CN    102253981 A   11/2011
(Continued)

OTHER PUBLICATIONS

Korean Office Action dated Feb. 26, 2019, issued in Korean Patent Application No. 10-2015-0055129.
(Continued)

*Primary Examiner* — Diane M Wills
(74) *Attorney, Agent, or Firm* — Jefferson IP Law, LLP

(57) ABSTRACT

A server is disclosed. A server for providing a content to a user terminal device providing a virtual reality service comprises: a communication unit for performing communication with at least one source device and the user terminal device; and a processor for, when a content transmission request for a preconfigured location is received from the user terminal device, receiving a content photographed in a real time from a source device of the preconfigured location on the basis of location information received from at least one source device, and providing the content to the user terminal device.

2 Claims, 19 Drawing Sheets

(51) Int. Cl.

| | | |
|---|---|---|
| *G06Q 50/10* | (2012.01) | |
| *H04N 21/2668* | (2011.01) | |
| *H04N 21/239* | (2011.01) | |
| *H04N 21/6587* | (2011.01) | |
| *G06F 16/9537* | (2019.01) | |
| *G06F 3/01* | (2006.01) | |
| *G06F 3/0481* | (2013.01) | |
| *H04N 21/2187* | (2011.01) | |
| *H04N 21/81* | (2011.01) | |
| *G06F 3/0482* | (2013.01) | |

(52) U.S. Cl.
CPC ......... *G06F 16/9537* (2019.01); *G06Q 50/01* (2013.01); *G06Q 50/10* (2013.01); *G06T 19/00* (2013.01); *H04N 21/2187* (2013.01); *H04N 21/2393* (2013.01); *H04N 21/2668* (2013.01); *H04N 21/6587* (2013.01); *H04N 21/816* (2013.01); *G06F 3/016* (2013.01); *G06F 3/0482* (2013.01)

(58) Field of Classification Search
CPC ........ G06Q 50/01; G06Q 50/10; G06T 19/00; G06T 19/006; H04N 21/2393; H04N 21/816; H04N 21/2187; H04N 21/2668
See application file for complete search history.

(56) References Cited

U.S. PATENT DOCUMENTS

| | | | |
|---|---|---|---|
| 9,215,293 B2 | 12/2015 | Miller | |
| 9,645,221 B1* | 5/2017 | Heizer | G06Q 30/0255 |
| 2003/0210806 A1 | 11/2003 | Yoichi et al. | |
| 2004/0123125 A1* | 6/2004 | Zuili | H04N 7/163 |
| | | | 713/193 |
| 2006/0152592 A1* | 7/2006 | Chishima | H04N 7/185 |
| | | | 348/211.3 |
| 2009/0015672 A1 | 1/2009 | Clapp | |
| 2010/0251173 A1 | 9/2010 | Imanishi | |
| 2011/0283223 A1 | 11/2011 | Vaittinen et al. | |
| 2012/0198359 A1* | 8/2012 | Lossia | G06Q 50/01 |
| | | | 715/758 |
| 2013/0132375 A1* | 5/2013 | Jones | G06F 16/2425 |
| | | | 707/722 |
| 2013/0218765 A1 | 8/2013 | Hammad et al. | |
| 2014/0214986 A1* | 7/2014 | Hwang | H04L 51/046 |
| | | | 709/206 |
| 2014/0237493 A1* | 8/2014 | Russo | H04N 21/47217 |
| | | | 725/5 |
| 2014/0285634 A1* | 9/2014 | Rhoads | G06T 15/04 |
| | | | 348/47 |
| 2014/0286566 A1* | 9/2014 | Rhoads | G06T 3/4038 |
| | | | 382/154 |
| 2014/0347477 A1* | 11/2014 | Kritt | H04N 5/265 |
| | | | 348/143 |
| 2014/0380163 A1 | 12/2014 | Peng et al. | |
| 2015/0015608 A1* | 1/2015 | Park | G06T 19/006 |
| | | | 345/633 |
| 2015/0020135 A1* | 1/2015 | Frusina | H04N 21/4621 |
| | | | 725/116 |
| 2015/0032823 A1* | 1/2015 | Miller | H04L 67/38 |
| | | | 709/205 |

FOREIGN PATENT DOCUMENTS

| | | |
|---|---|---|
| CN | 103491339 A | 1/2014 |
| EP | 1 675 377 A2 | 6/2006 |
| JP | 2003-153230 A | 5/2003 |
| JP | 2006-293378 A | 10/2006 |
| JP | 2014-182597 A | 9/2014 |
| JP | 2014-187559 A | 10/2014 |
| KR | 10-2012-0041921 A | 5/2012 |
| KR | 10-2012-0091492 A | 8/2012 |
| KR | 10-2012-0122196 A | 11/2012 |
| KR | 10-2014-0093970 A | 7/2014 |
| KR | 10-1436914 B1 | 9/2014 |
| KR | 10-2014-0121764 A | 10/2014 |
| KR | 10-2015-0004494 A | 1/2015 |
| KR | 10-2015-0008733 A | 1/2015 |
| WO | 2014/031126 A1 | 2/2014 |

OTHER PUBLICATIONS

Chinese Office Action dated Aug. 1, 2019, issued in Chinese Patent Application No. 201580078978.2.
Korean Office Action dated Aug. 5, 2019, issued in Korea Patent Application No. 10-2015-0055129.
Chinese Office Action dated Apr. 10, 2020, issued in Chinese Application No. 201580078978.2.
European Search Report dated Feb. 27, 2020, issued in European Application No. 15 890 029.0-1208.
Chinese Office Action dated Dec. 2, 2020, issued in Chinese Application No. 201580078978.2.

\* cited by examiner

SERVER, USER TERMINAL DEVICE, AND CONTROL METHOD THEREFOR

TECHNICAL FIELD

The present disclosure relates to a server, a user terminal device, and a control method therefor, and more particularly, to a server, a user terminal device, and a control method therefor, which provide a VR service.

BACKGROUND ART

Virtual reality (VR) technology refers to technology that three-dimensionally realizes a virtual space for a participant by immersing the participant in the virtually created world by making all senses (sight, hearing, smell, taste, touch) of a human body interact with one another in a 3D virtual environment created by computer graphic (CG) technology and similar to a real environment, and aims at maximizing utilization of information by immersing humans in this virtual space.

For example, when a user wears a VR headset, a ski resort covered with snow appears in front of user's eyes. The user is in the middle of the ski resort even when the user turns user's head up and down as well as shaking head side to side. Snowboards at user's feet start to slide and suddenly a cliff appears. At that instant, there is nothing blow user's feet. The user recognizes that it is a virtual reality with the brain, but feels as if the virtual ski resort in the headset is real since a sense of realism is great.

As described above, the VR service provides a new experience to the user, but there is a problem that a relevant service is not commercialized in relation to purchasing and consuming of contents.

DETAILED DESCRIPTION OF THE PRESENT DISCLOSURE

Technical Objects

The present disclosure has been developed in order to solve the above-mentioned problems, and an object of the present disclosure is to provide a server, a user terminal device, and a control method therefor, which is able to provide a virtual experience service by interlocking with a plurality of devices.

Technical Solving Method

According to an exemplary embodiment of the present disclosure to achieve the above-described object, a server which provides a content to a user terminal device providing a virtual reality service includes: a communication unit configured to communicate with at least one source device and the user terminal device; and a processor configured to, in response to a content transmission request on a predetermined location being received from the user terminal device, receive a content photographed by a source device of the predetermined location in real time based on location information received from the at least one source device, and transmit the content to the user terminal device.

In addition, the processor may be configured to transmit a plurality of photographed contents received from a plurality of source devices to the user terminal device in sequence based on location information received from the plurality of source devices, or may be configured to combine the plurality of photographed contents received from the plurality of source devices based on the location information received from the plurality of source devices and transmit a combined content to the user terminal device.

In addition, the processor may be configured to select a content corresponding to authority information from among the contents received from the source devices, based on the authority information regarding a content sharing level of a content that is set by the at least one source device to be able to be shared with the user terminal device, and transmit the content to the user terminal device.

In addition, the processor may be configured to process the content received from the source device according to a predetermined condition set at the user terminal device, and transmit the content to the user terminal device.

In addition, in response to the content received from the source device being a 3D content, the processor may be configured to generate a left-eye 3D space image and a right-eye 3D space image by projecting a left-eye image and a right-eye image included in the 3D content onto a virtual 3D space, and, in response to information corresponding to a motion state of the user terminal device being received from the user terminal device, the processor may be configured to extract a view point region corresponding to the motion state of the user terminal device from the generated left-eye and right-eye 3D space images, and transmit an image of the view point region to the user terminal device.

In addition, a user terminal device providing a virtual reality service, the user terminal device includes: a display; a communication unit configured to communicate with a server; and a processor configured to, in response to a user command to specify a predetermined location being inputted, transmit information related to the corresponding location to the server, and receive a real-time photographed content related to the corresponding location from the server and display the content through the display.

In addition, the processor may be configured to receive only a content selected at the server based on authority information regarding a content sharing level of a content that is set by at least one source device providing the real-time photographed content to be able to be shared with the user terminal device.

In addition, in response to a user command to set a first point and a second point on a UI screen being inputted, the processor may be configured to control to transmit information corresponding to a predetermined path connecting the first point and the second point to the server, and receive a plurality of contents related to the predetermined path from the server and display the plurality of contents.

In addition, in response to a user command to set a first point and a second point on a UI screen being inputted, the processor may be configured to control to transmit information corresponding to a predetermined path connecting the first point and the second point to the server, and receive a combined content in which a plurality of contents related to the predetermined path are combined from the server and display the combined content.

In addition, in response to a user command to set a predetermined area being inputted, the processor may be configured to control to transmit information related to the corresponding area to the server, and receive location information of at least one source device located in the predetermined area from the server and display a GUI indicating the location of the at least one source device.

In addition, the processor may be configured to receive authority information regarding a content sharing level of a content that the at least one source device is able to share with the user terminal device from the server, and display the authority information on a region adjacent to a GUI indicating the location of the source device.

In addition, in response to a user command to specify the predetermined location on a UI screen providing a virtual experience service being inputted, the processor may be configured to control to transmit information related to the corresponding location to the server, and receive a virtual experience content photographed at the corresponding location from the server and display the virtual experience content.

In addition, the virtual experience service may include at least one of a virtual road experience service, a virtual tour service, and a virtual event experience service.

According to an exemplary embodiment of the present disclosure, a control method of a server which provides a content to a user terminal device providing a virtual reality service includes: receiving a content transmission request on a predetermined location from the user terminal device; and receiving a real-time photographed content from a source device of the predetermined location based on location information received from at least one source device, and providing the content to the user terminal device in the form of streaming.

In addition, the providing the content to the user terminal device in the form of streaming may include transmitting a plurality of photographed contents received from a plurality of source devices to the user terminal device in sequence based on location information received from the plurality of source devices, or combining the plurality of photographed contents received from the plurality of source devices based on the location information received from the plurality of source devices and transmitting a combined content to the user terminal device.

In addition, the providing the content to the user terminal device in the form of streaming may include selecting a content corresponding to authority information from among the contents received from the source devices, based on the authority information regarding a content sharing level of a content that is set by the at least one source device to be able to be shared with the user terminal device, and transmitting the content to the user terminal device.

In addition, the providing the content to the user terminal device in the form of streaming may include processing the content received from the source device according to a predetermined condition set at the user terminal device, and transmitting the content to the user terminal device.

According to an exemplary embodiment of the present disclosure, a control method of a user terminal device which provides a virtual reality service includes: in response to a user command to specify a predetermined location being inputted, transmitting information related to the corresponding location to the server; and receiving a real-time photographed content related to the corresponding location from the server and displaying the content through a display.

In addition, the displaying includes receiving only a content selected at the server based on authority information regarding a content sharing level of a content that is set by at least one source device providing the real-time photographed content to be able to be shared with the user terminal device, and displaying the content.

In addition, the transmitting to the server comprises, in response to a user command to set a first point and a second point on a UI screen being inputted, transmitting information corresponding to a predetermined path connecting the first point and the second point to the server, and the displaying includes receiving a plurality of contents related to the predetermined path from the server and displaying the plurality of contents, or receiving a combined content in which a plurality of contents related to the predetermined path are combined from the server and displaying the combined content.

Advantageous Effect

According to various exemplary embodiments of the present disclosure described above, a user can experience a sense of realism of a remote place using information obtained through wearable devices of others, and thus can be provided with various experiences.

BRIEF DESCRIPTION OF THE DRAWINGS

FIG. 11 is a view to illustrate a method for providing a virtual tour service according to an exemplary embodiment of the present disclosure;

FIG. 12 is a view to illustrate a method for providing a virtual event experience service according to an exemplary embodiment of the present disclosure;

BEST MODE FOR EMBODYING THE INVENTION

Mode for Embodying the Invention

Hereinafter, the present disclosure will be described in more detail with reference to the accompanying drawings.

Figure 1:
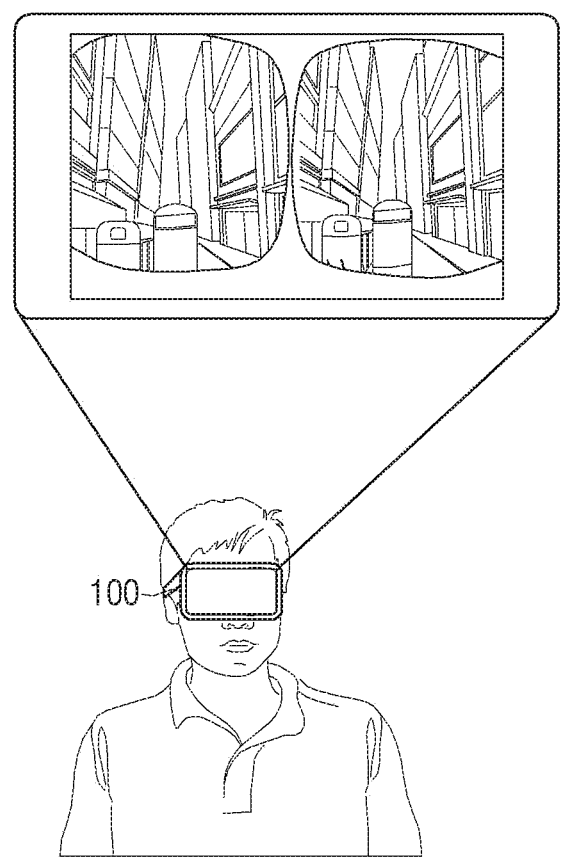
FIG. 1 is a view showing a display device providing a virtual reality service according to an exemplary embodiment of the present disclosure.

FIG. 1 is a view showing a display device providing a virtual reality service according to an exemplary embodiment of the present disclosure.

Referring to FIG. 1, a user terminal device 100 according to an exemplary embodiment of the present disclosure may be worn on a user's head and perform a function as a head mounted display (HMD). For example, the user terminal device 100 may be implemented by using a smart phone or a tablet, and may be attached to a front surface of a body (for example, a housing) having a shape of glasses, a headset, or a helmet to provide an image to user's both eyes.

For example, when the user terminal device 100 implemented by using the smart phone is attached to the front surface of the headset body, a display provided on the smart phone is positioned close to user's both eyes. Accordingly, the user terminal device 100 may display an image through the display and provide the image in front of user's eyes. In this case, temples or bands may be formed on the rear surface of the headset body to allow the user terminal device 100 to be worn on user's head. In addition, the headset body may have a track pad for adjustment, a return button, a sound volume control key, or the like mounted thereon.

In addition, the user terminal device 100 may be provided with its own display, and may be implemented by using a device having a shape which is wearable on user's head. In this case, the display may not be attachable and detachable and may be fixed.

When the user wears the user terminal device 100 on user's head, a region viewed by user's left eye and a region viewed by user's right eye may be spatially separated from each other in the display. Accordingly, the user terminal device 100 may display different images on the region viewed by the user's left eye and the region viewed by the user's right eye in the display, and may allow the different images to enter the user's left and right eyes.

The user terminal device 100 may be implemented to be able to promptly update a view image by tracking a user's head motion, and may be implemented to provide a 3D image as well as a 2D image. For example, when the user wears the user terminal device 100 on user's head, the user terminal device 100 may completely take control of the user's view and provide a 3D image of 360 degrees and a sound, and a gyro sensor and an acceleration sensor provided in the user terminal device 100 may sense a user's nodding or user's shaking head and allows the user terminal device 100 to provide a visual effect according to the direction of the user's motion.

Accordingly, the user may be provided with a 3D image existing in user's line of vision in a panorama 3D image, so that the user can experience virtual reality (VR).

Figure 2:
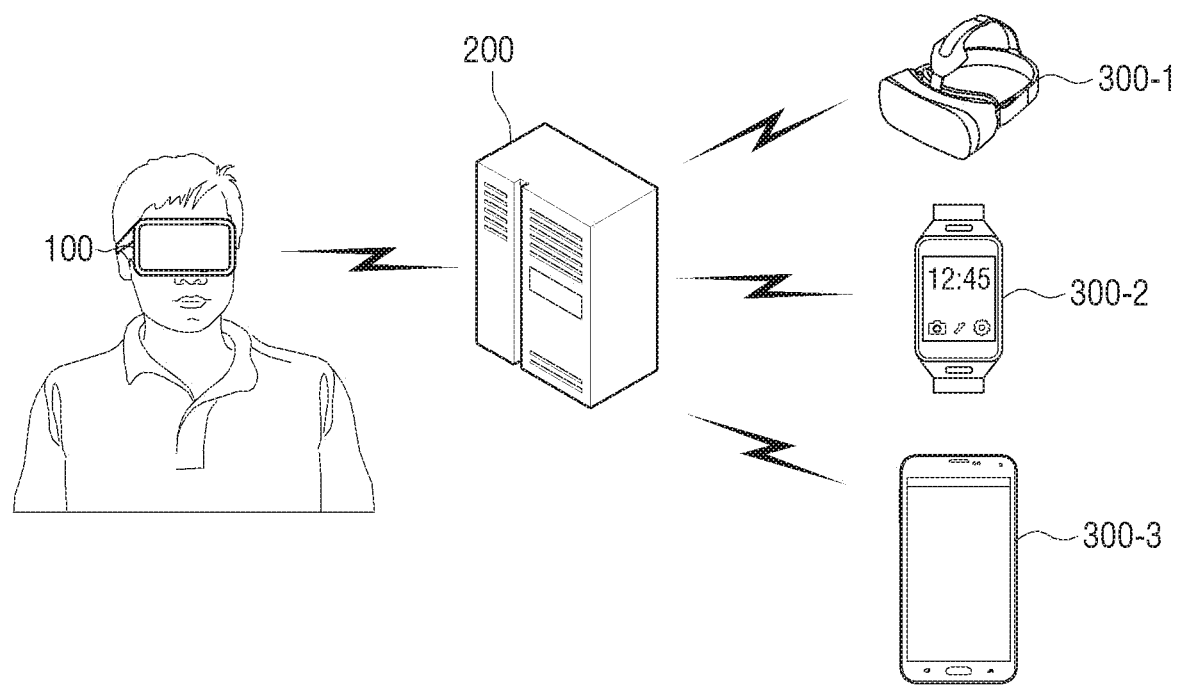
FIG. 2 is a view to illustrate a content providing system according to an exemplary embodiment of the present disclosure.

FIG. 2 is a view to illustrate a content providing system according to an exemplary embodiment of the present disclosure.

As shown in FIG. 2, the content providing system according to an exemplary embodiment of the present disclosure includes a user terminal device 100, a server 200, and at least one source device 300-1, 300-2, 300-3.

The user terminal device 100 may communicate with the server 200 to receive a content transmitted from various types of source devices 300-1, 300-2, and 300-3 to the server 200 as real-time streaming. In this case, the source device 300-1, 300-2, and 300-3 may be implemented by using a wearable device such as smart glasses, a smart watch, or the like, but is not limited thereto and any device that is provided with a photographing function, such as a smart phone, a camcorder, a camera, or the like, can be applied.

Accordingly, the user terminal device 100 may receive an image photographed at a remote place in real time through the server 200, and provide a virtual experience service regarding the corresponding place to the user. Hereinafter, various embodiments of the present disclosure will be described in detail with reference to the accompanying drawings.

Figure 3A:
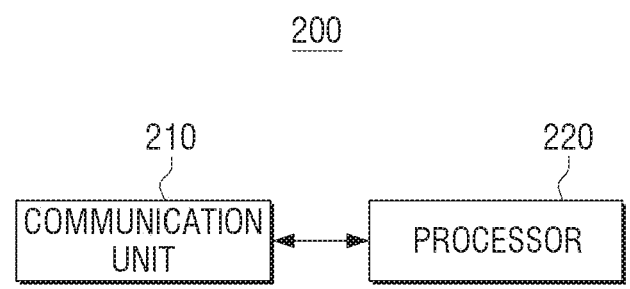
FIGS. 3A and 3B are block diagrams illustrating a configuration of a server according to an exemplary embodiment of the present disclosure.
Figure 3B:
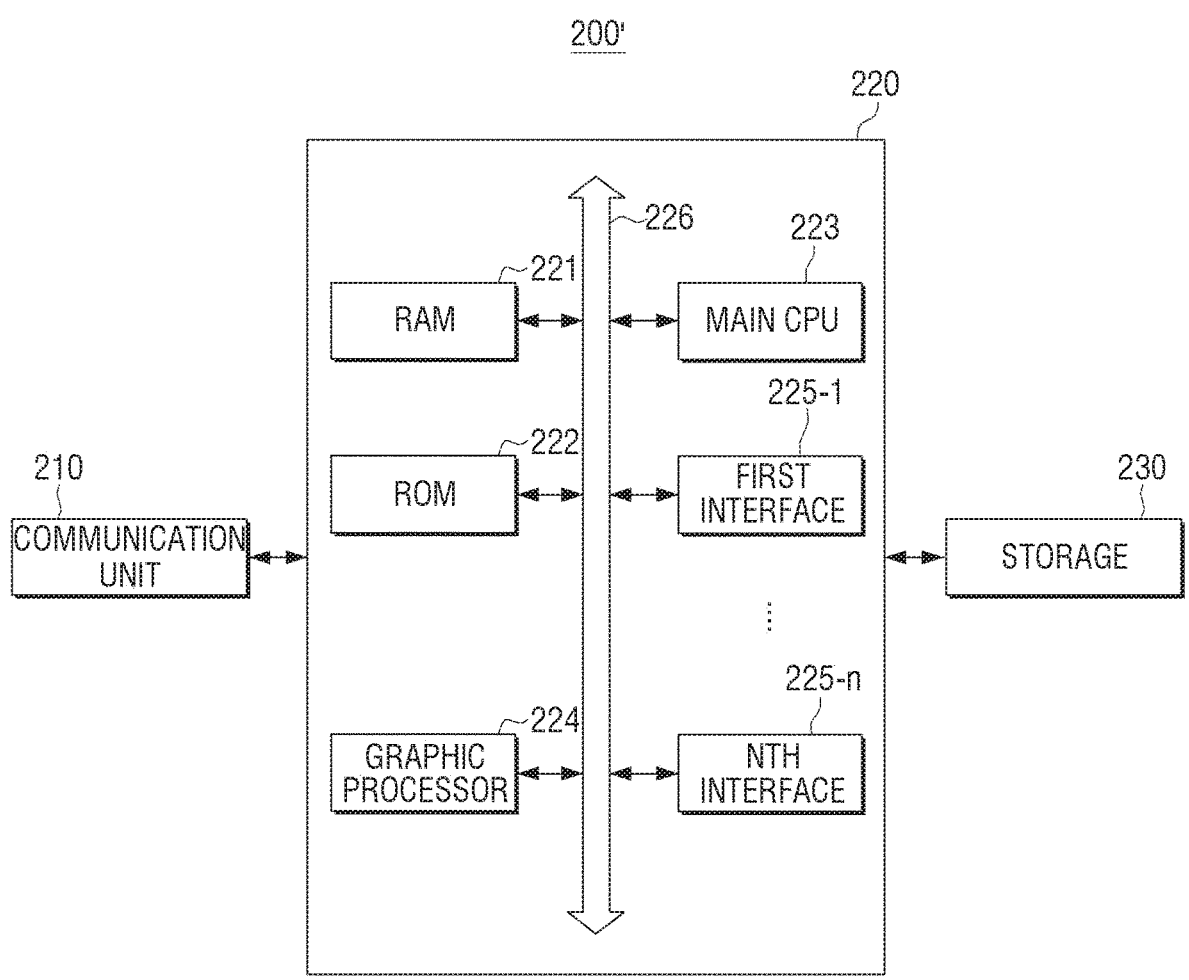

FIGS. 3A and 3B are block diagrams showing a configuration of a server according to an exemplary embodiment of the present disclosure.

Referring to FIG. 3A, the server 200 according to an exemplary embodiment of the present disclosure includes a communication unit 210 and a processor 220.

Herein, the server 200 may be implemented by using a central server (or an integrated server) which is responsible for interaction between various operating systems and applications in all network systems, or a cloud server using cloud computing technology. Herein, the cloud computing refers to Internet-based computing technology, and is a web-based software service which places a program at a utility data server on the Internet and calls the program at a computer or a mobile phone whenever it is requested.

The communication unit 210 communicates with the user terminal device 100 and the source device 300-1, 300-2, 300-3.

The communication unit 210 may be implemented by using a wireless communication module which is connected to an external network according to a wireless communication protocol such as WiFi, IEEE, or the like and performs communication. In addition, the wireless communication module may communicate with the user terminal device 100 and the source device 300-1, 300-2, 300-3 according to various communication methods such as $3^{rd}$ generation (3G), $3^{rd}$ generation partnership project (3GPP), long term evolution (LTE), or the like. Herein, the communication unit 210 may communicate with the user terminal device 100 and the source device 300-1, 300-2, 300-3 through one communication module, but may be implemented to communication through a separate communication module. Herein, the separate communication module may be implemented to support the same communication method, but may be implemented to support different communication methods.

For example, in response to a predetermined event occurring, the communication unit 210 may communicate with the user terminal device 100 and the source device 300-1, 300-2, 300-3 according to a pre-defined communication method to be interlocked therewith. Herein, the interlocking may refer to all states in which communication is enabled, and includes an operation of initializing communication between the server 200 and the user terminal device 100 and between the server 200 and the source device 300-1, 300-2, 300-3, an operation of forming a network, and an operation of pairing. For example, according to an event in which an application providing a virtual experience service according to the present disclosure is driven at the user terminal device 100, communication may be performed between the server 200 and the user terminal device 100.

The communication unit 210 may receive an image photographed by the source device 300-1, 300-2, 300-3 in real time under the control of the processor 220, which will be described later, and may stream the received image to the user terminal device 100.

The processor 220 controls an overall operation of the server 200.

In particular, in response to a content transmission request on a predetermined location being received from the user terminal device 100, the processor 220 may receive a content photographed by a source device at the predetermined location in real time based on location information received from at least one source device 300-1, 300-2, 300-3, and may provide the content to the user terminal device 100 in the form of streaming. Herein, the at least one source device 300-1, 300-2, 300-3 may be implemented by using a wearable device such as smart glasses, a smart watch, or the like as described above, and may photograph a place for the corresponding source device. Accordingly, the user of the user terminal device 100 may experience a current environment of the corresponding place in real time through the image photographed by the source device 300-1, 300-2, 300-3 without directly visiting the corresponding place.

The content received from the source device 300-1, 300-2, 300-3 may be a normal 2D moving image, but is not limited thereto. The content may include a 3D image including a left-eye image and a right-eye image for providing a VR service, a panorama VR content, a normal 2D image, or the like.

In addition, in response to a content transmission request on a changed location being received from the user terminal device 100, the processor 220 may receive a content photographed by the source device 300-1, 300-2, 300-3 corresponding to the changed location information in real time and may stream the content to the user terminal device 100. For example, in response to a user command to select another location being inputted at the user terminal device 100, a content transmission request on the corresponding location may be transmitted to the server 200.

In this case, in response to a virtual experience service request on a specific place being received from the user terminal device 100, the processor 220 may transmit, to the user terminal device 100, information displaying the location of the source device 300-1, 300-2, 300-3 based on map information of the corresponding place, and the user of the user terminal device 100 may transmit a content transmission request on the specific place to the server 200 through a command to select a source device to share a photographed image based on information displayed on the screen. However, according to circumstances, it is possible to display a location of a user of a source device that can share an image within a current range of the line of view by applying AR technology to a currently displayed image. In this case, distance information of the user of the corresponding source device may be additionally displayed.

In addition, the processor 220 may transmit a plurality of photographed contents received from the plurality of source devices 300-1, 300-2, 300-3 to the user terminal device 100 in sequence based on location information received from the plurality of source devices 300-1, 300-2, 300-3, or may combine the plurality of photographed contents received from the plurality of source devices 300-1, 300-2, 300-3 based on the location information received from the plurality of source devices 300-1, 300-2, and 300-3, and may transmit the combined content to the user terminal device 100. For example, when contents photographed in a path passing through an a location→a b location→a c location are transmitted to the user terminal device 100, the processor 220 may provide photographed images received from the plurality of source devices 300-1, 300-2, and 300-3 corresponding to the a location, the b location, and the c location, respectively, to the user terminal device 100 in sequence, or may configure a combined image in which photographed images received from the plurality of source devices 300-1, 300-2, and 300-3 corresponding to the a location, the b location, and the c location are connected with one another in sequence, and may transmit the combined image to the user terminal device 100.

In this case, the processor 220 may process the contents received from the plurality of source devices 300-1, 300-2, 300-3 to be suitable for the user terminal device 100 based on content information which varies according to resolution information of the plurality of source devices 300-1, 300-2, and 300-3 and the user terminal device 100, a display arrangement state, a screen size, or the like, and may provide the contents to the user terminal device 100. However, according to circumstances, the user terminal device 100 may process the received contents according to a display format and display the contents.

In addition, the processor 220 may process the plurality of photographed contents received from the plurality of source devices 300-1, 300-2, and 300-3 to be suitable for the display format of the user terminal device 100, combine the processed contents, and provide the combined content to the user terminal device 100.

In addition, the processor 220 may transmit only at least a portion of the contents corresponding to authority information to the user terminal device 100 based on authority information on at least one source device 300-1, 300-2, 300-3. Herein, the authority information refers to information regarding a sharing level of a content which is set by the user of at least one source device 300-1, 300-2, 300-3 as being able to be shared with another terminal device. In addition, when the processor 220 combines the plurality of contents and provides the combined content, the processor 220 may combine only at least a portion of the contents corresponding to the authority information and provide the combined content to the user terminal device 100.

That is, the user of at least one source device 300-1, 300-2, 300-3 may set the sharing level of the content, such as audio data, video data, location information, information on whether a message is received, or the like, and the processor 220 may select only the content that can be shared by the authority information from among the contents received from the at least one source device 300-1, 300-2, 300-3, and may provide the content to the user terminal device 100.

For example, when the user of at least one source device 300-1, 300-2, 300-3 sets authority information to share only video data and not to share audio data, the processor 220 may transmit only the video data to the user terminal device 100. In another example, when the user of at least one source device 300-1, 300-2, 300-3 sets authority information to be able to receive a message from another terminal device, the user of the user terminal device 100 may transmit a message to at least one source device 300-1, 300-2, 300-3.

In the above-described embodiment, the server 200 determines authority information, and may select a sharable content from the contents received from at least one source device 300-1, 300-2, 300-3 based on the authority information and transmit the content to the user terminal device 100. However, according to another exemplary embodiment, at least one source device 300-1, 300-2, 300-3 may transmit only a content corresponding to authority information to the server 200. For example, when the user of at least one source device 300-1, 300-2, 300-3 sets authority information to share only video data and not to share audio data, the server 200 may receive only the video data from at least one source devices 300-1, 300-2, 300-3.

In addition, the processor 220 may process a content received from at least one source device 300-1, 300-2, 300-3 and may transmit the content to the user terminal device 100.

In this case, the processor 220 may process the content received from at least one source device 300-1, 300-2, 300-3 according to a predetermined condition which is set at the user terminal device 100, and may transmit the content to the user terminal device 100.

For example, when the user of the user terminal device 100 sets to receive a virtual experience service in the form of a panorama content, the processor 220 may process the content received from at least one source device 300-1, 300-2, 300-3 in the form of the panorama content and may transmit the content to the user terminal device 100.

Specifically, the processor 220 may generate a left-eye 3D space image and a right-eye 3D space image by projecting a left-eye image and a right-eye image included in a 3D content received from the source device 300-1, 300-2, 300-3 onto a virtual 3D space. Thereafter, in response to information corresponding to a motion state of the user terminal device 100 being received from the user terminal device 100, the processor 220 may extract a view point region corresponding to the motion state of the user terminal device 100 from the left-eye and right-eye 3D space images, and may transmit the view point region to the user terminal device 100.

In this case, the processor 220 may determine a view point (or direction) region corresponding to the motion state of the user terminal device 100 in the inputted 3D image based on motion information received from the user terminal device 100. Thereafter, the processor 220 may transmit an image of the determined view point to the user terminal device 100. Herein, the motion information may be real-time direction information and angle information regarding all directions of the user terminal device 100, but is not limited thereto and may include moving speed information, rotation information, or the like. In addition, the processor 220 may receive information on a direction and an angle which are changed with reference to previously received direction and angle information since initial direction information and angle information have been received from the user terminal device 100, but is not limited thereto.

In this case, the processor 220 may transmit an image corresponding to the user terminal device 100 to the corresponding user terminal device 100 based on device information received from the user terminal device 100, for example, a device ID. In addition, the processor 220 may secure a certain region of an image buffer as a transmission buffer based on device display information received from the user terminal device 100, may buffer an image corresponding to the motion information of the user terminal device 100 in the transmission buffer, and may transmit the image to the corresponding user terminal device 100. In this case, the processor 220 may separately secure transmission buffers corresponding to the respective user terminal devices 100.

In addition, the processor 220 may decompress (or decode) the inputted image and store the image in the image buffer, may extract a region corresponding to the motion information of the user terminal device 100 from the image stored in the image buffer, and then may compress (or encode) the extracted image and transmit the image to the user terminal device 100.

Alternatively, the processor 220 may extract a region corresponding to the motion information of the user terminal device 100 and then decode the image and transmit it to the user terminal device 100, and may decode only a margin region in the region corresponding to the motion information except for a previously transmitted image and transmit the image.

Alternatively, the processor 220 may transmit the margin image regarding the region determined based on the motion information of the user terminal device 100 to the user terminal device 100, as a low quality image and an encoded image of a codec, along with a main image decoded based on the content received from the source device 300-1, 300-2, 300-3. Herein, the margin image may be an image except for the decoded main image in the region determined based on the motion information of the user terminal device 100.

In this case, the user terminal device 100 may decode the received margin image, combine it with the received main image, and output the image, such that a delay in transmitting the image can be minimized.

In addition, the processor 220 may predict future motion information of a slave device 200-1, 200-2, 200-3 based on the currently received motion information of the user terminal device 100, and may transmit an image of a view point region corresponding to a future motion state of the user terminal device 100 from among images inputted based on the predicted motion information to the user terminal device 100. For example, the processor 220 may track and predict the future motion state of the user terminal device 100 using an existing filtering method such as a Kalman filter.

In addition, when motion information received from a plurality of user terminal device 100 falls within a predetermined threshold range, the processor 200 may group the plurality of user terminal devices into one group, and transmit the image of the same view point region to the user terminal devices 100 belonging to the same group. For example, the processor 220 may group first and second user terminal devices having motion information between 10° and 15° in the right direction into one group, and transmit the image of the same view point region corresponding to the corresponding motion information to the first and second user terminal devices.

FIG. 3B is a block diagram showing a specific configuration of the server illustrated in FIG. 3A. Referring to FIG. 3B, the server 200' includes the communication unit 210, the processor 220, and a storage 230. The same elements in FIG. 3B as those illustrated FIG. 3A will not be described in detail.

The storage 230 may store an operating system (O/S) software module for driving the server 200, and various data such as a variety of information required to perform the function of the server 200. For example, the storage 230 may store authority information on each source device 300-1, 300-2, 300-3.

The operations of the above-described processor 220 may be performed by a program stored in the storage 230.

Specifically, the processor 220 may include a random access memory (RAM) 221, a read only memory (ROM) 222, a main central processing unit (CPU) 223, a graphic processor 224, first to nth interfaces 225-1 to 225-n, and a bus 226.

The RAM 221, the ROM 222, the main CPU 223, the graphic processor 224, and the first to nth interfaces 225-1 to 225-n may be connected with one another via the bus 226.

The first to nth interfaces 225-1 to 225-n may be connected with the above-described elements. One of the interfaces may be a network interface connected to an external device via a network.

The main CPU 223 may access the storage 230 and performs booting using an O/S stored in the storage 230. In addition, the main CPU 223 performs various operations using various programs, contents, data, or the like stored in the storage 230. For example, the main CPU 223 may determine a source device of a location desired by the user terminal device 100 using various modules stored in the storage 230, and provide a photographed image received from the corresponding source device to the user terminal device 100.

The ROM 222 stores a set of commands for booting a system. In response to a turn-on command being inputted and power being supplied, the main CPU 223 copies the O/S stored in the storage 230 onto the RAM 221 according to the command stored in the ROM 222, executes the O/S and boots the system. In response to booting being completed, the main CPU 223 copies various application programs stored in the storage 230 onto the RAM 221, executes the programs copied onto the RAM 221, and performs various operations.

The graphic processor 224 may generate a screen including various objects such as an icon, an image, a text, and the like, using a calculator (not shown) and a renderer (not shown). The calculator (not shown) calculates attribute values of the objects to be displayed, such as coordinate values, shape, size, color, and the like, according to the layout of the screen based on a received control command. The renderer (not shown) generates a screen of various layouts including the objects based on the attribute values calculated by the calculator (not shown).

The processor 220 may provide a content to the user terminal device 100 using pre-stored data according to circumstances.

Specifically, the processor 220 may select an image according to a request of the user terminal device 100 from a database in which photographed images are pre-stored and provide the image, or may combine the selected image and provide the image. For example, when the user of the user terminal device 100 sets a start point and an arrival point in a virtual space, the processor 220 may generate an optimal path, select image data from the start to the end from the database according to the generated path, obtain background images one by one from the start point, and transmit the image to the user terminal device 100. In addition, the processor 220 may set the virtual space by mapping the image obtained from the database onto the virtual space, and generate a virtual camera in the virtual space through a VR engine, such that an image of the virtual space projected by the virtual camera is provided to the user terminal device 100. In this case, the location of the camera in the virtual space may be determined according to the generated path, and the direction of the camera may be determined based on a direction of an HMD.

In addition, the processor 220 may provide various modes according to each virtual experience service. For example, in the case of a virtual path finding experience service, the processor 220 may provide a car mode, a walking mode, a running mode, or the like, and may provide audio feedback, haptic feedback, or the like according to user selection. The car mode is a mode which provides a virtual road experience while moving in a path advancing direction in background data obtained from the database. In the case of such a moving mode, a short distance appears in a current 3D space image, and, when the user needs to move to a long distance and there is a connected input image or a connected 3D space image, the current 3D space image and the 3D space image may be combined when the user moves, and a combined image may be provided. In this case, information of corresponding audio/haptic may be obtained from the database based on metadata generated or stored through an image analysis and may be provided to the user terminal device 100. Herein, the metadata may be, for example, sounds of nature such as a birdsong, chirping of cicadas, sounds of rain, artificial sound data such as car sounds, train sounds, airplane sounds, haptic data having a profile of various periods and strength, data for adjusting screen brightness of an image, or the like.

The walking mode and the running mode are similar modes, but there is a difference in a moving speed in the same background and also there is a difference in the location of a virtual camera in the virtual space. In this case, when a path is selected by a user input and the walking mode and the running mode are selected, a corresponding path may be generated and a ripple may be generated in a vertical direction of the generated path. Herein, the period and the amplitude of the ripple may vary according to the walking mode and the running mode and may have a pre-defined size. When an image obtained from the database is a full 3D image, the image may be provided based on a change in the location/direction of the camera according to the ripple and a virtual VR engine. Alternatively, when the image obtained from the database is a binocular disparity image, depth information may be extracted from a virtual view point image, and information of a region appearing based on the extracted depth information may be virtually generated. Alternatively, when the image obtained from the database is a monocular image, the image may be provided only based on a change in the location/direction of the virtual camera. In addition, a zoom function may be provided according to user selection while the user is moving according to each mode. The user may view an image by magnifying a background through the zoom function, and, when a head motion is changed in the zoom state, for example, when a change in the head motion increases by more than a predetermined level in comparison to a reference before the zoom function starts, or when a user's zoom mode disabling input enters, the zoom function may be terminated.

Figure 4A:
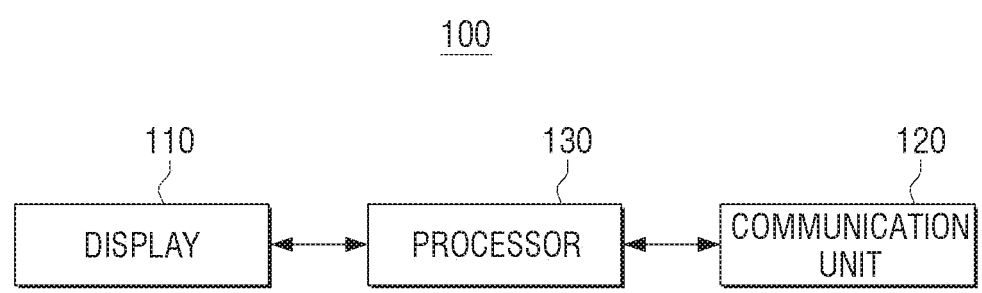
FIGS. 4A and 4B are block diagrams illustrating a configuration of a user terminal device according to an exemplary embodiment of the present disclosure.
Figure 4B:
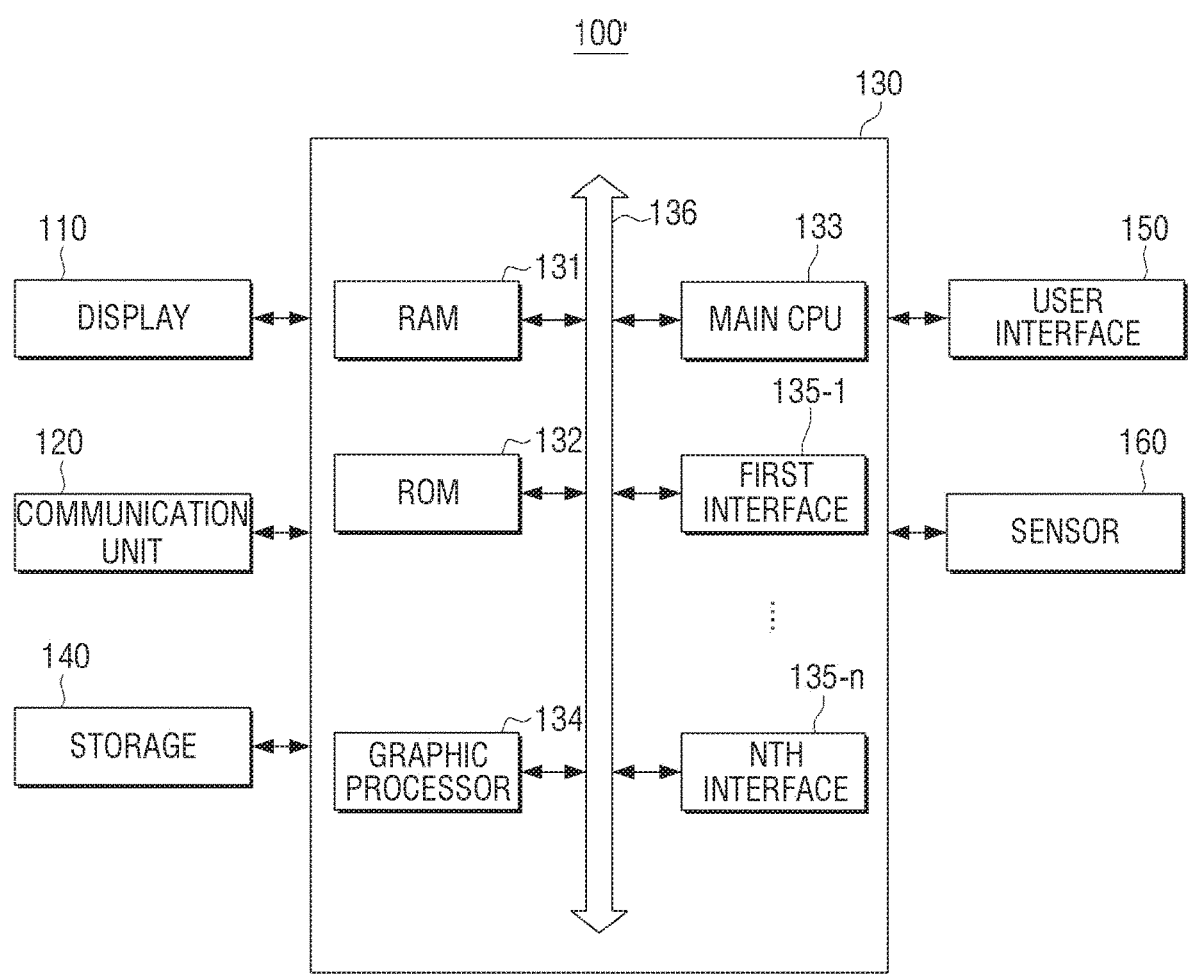

FIGS. 4A and 4B are block diagrams showing a configuration of a user terminal device according to an exemplary embodiment of the present disclosure.

Referring to FIG. 4A, the user terminal device 100 according to an exemplary embodiment of the present disclosure includes a display 110, a communication unit 120, and a processor 130.

The display 110 displays a variety of information.

Herein, the display 110 may be implemented by using a liquid crystal display (LCD) panel, organic light emitting diodes (OLED), or the like, but is not limited thereto. In addition, the display 110 may be implemented by using a flexible display, a transparent display, or the like according to circumstances. When a smart phone is connected and is used as a monitor as mentioned in FIG. 1, the display 110 may be implemented by using a display of the smart phone.

The communication unit 120 may communicate with the server 200. The communication unit 120 may be implemented by using a wireless communication module which is connected to an external network according to a wireless communication protocol such as WiFi, IEEE, or the like and performs communication. In addition, the wireless communication module may communicate with the server 200 through various communication methods such as $3^{rd}$ generation (3G), $3^{rd}$ generation partnership project (3GPP), long term evolution (LTE), or the like.

The processor 130 controls an overall operation of the user terminal device 100.

In particular, in response to a user command to specify a predetermined location being inputted, the processor 130 may transmit information related to the corresponding location to the server 200, and may receive a real-time photographed content related to the corresponding location from the server 200 and display the content through the display 110.

Herein, the user command to specify the predetermined location may be a user command to select a specific place, a user command to select an event occurring in the specific place, or the like.

In addition, the processor 130 may receive only the content that is selected at the server 200 based on authority information regarding a sharing level of a content which is set by at least one source device providing a real-time photographed content as being sharable with the user terminal device 100.

In addition, in response to a user command to set a first point and a second point being inputted on a UI screen, the processor 130 may transmit information corresponding to a predetermined path connecting the first point and the second point to the server 200, and may receive a plurality of contents related to the predetermined path from the server 200 and display the contents on the screen.

In addition, in response to the user command to set the first point and the second point being inputted on the UI screen, the processor 130 may transmit the information corresponding to the predetermined path connecting the first point and the second point to the server 200, and may receive a combined content in which the plurality of contents related to the predetermined path are combined from the server 200 and display the combined content on the screen.

In addition, in response to a user command to set a predetermined area being inputted, the processor 130 may transmit information related to the corresponding area to the server 200, and may receive location information of at least one source device located in the predetermined area from the server 200 and display the location of the at least one source device on a screen of a GUI.

In addition, the processor 130 may receive authority information on a sharing level of a content that is set by at least one source device as being able to be shared with the user terminal device 100 from the server 200, and display the authority information on a region adjacent to the GUI indicating the location of the source device.

In addition, in response to a user command to specify a predetermined location on a UI screen providing a virtual experience service being inputted, the processor 130 may transmit information related to the corresponding location to the server 200, and may receive a virtual experience content photographed at the corresponding location from the server 200 and display the virtual experience content. Herein, the virtual experience service may include at least one of a virtual road experience service, a virtual tour service, and a virtual event experience service.

The processor 130 may zoom in or out the displayed content according to a user's zoom in/out command for magnifying or reducing the image.

Specifically, when the user terminal device 100 is implemented by using an HMD, the display 110 may display a left-eye image on a display region viewed by user's left eye and a right-eye image on a display region viewed by user's right eye, thereby providing a 3D image to the user. Herein, the left-eye image and the right-eye image may be implemented as a panorama 3D image.

In this case, the processor 130 may generate a left-eye 3D space image and a right-eye 3D space image by projecting the left-eye image and the right-eye image forming the 3D image onto a virtual 3D space. Herein, the generated 3D space image may be a panorama 3D image. That is, the processor 130 may generate the left-eye 3D space image and the right-eye 3D space image in which the left-eye image and the right-eye image exist in the direction of 360° with reference to the center of a virtual sphere space by projecting the left-eye image and the right-eye image onto the virtual sphere space.

In addition, the processor 130 may extract an image located in a direction viewed by the user wearing the HMD from the 3D space image, and display the extracted image through the display 110. Specifically, the processor 130 may determine a direction of user's line of vision using a sensor (not shown) provided in the user terminal device 100, and may extract images existing in regions of the user's line of vision from the left-eye 3D space image and the right-eye 3D space image using virtual cameras located at the centers of the left-eye 3D space image and the right-eye 3D space image, and display the extracted images. To achieve this, the processor 130 may sense a moving direction of the head of the user wearing the user terminal device 100 using at least one of a gyro sensor, an acceleration sensor, and a geomagnetic sensor provided in the user terminal device 100, and may determine the direction of the user's line of vision.

In addition, the processor 130 may place a virtual camera having a predetermined field of view (FOV) at the center of each of the left-eye 3D space image and the right-eye 3D space image, and then rotate the virtual camera in the direction of the user's line of vision, and may extract an image existing in the direction of the user's line of vision from each of the left-eye 3D space image and the right-eye 3D space image and display the image. For example, in response to it being determined that the user views the left side in the direction of 60° with reference to the front, the processor 130 may rotate the virtual cameras located at the centers of the left-eye 3D space image and the right-eye 3D space image to the left side in the direction of 60°, and may extract images existing on the left in the direction of 60° from the left-eye 3D space image and the right-eye 3D space image.

In this case, the processor 130 may display the image extracted from the left-eye 3D space image on a region viewed by the left eye of the user wearing the display device 100 from the display 110, and display the image extracted from the right-eye 3D space image on a region viewed by the right eye of the user wearing the display device 100 from the display 110. Accordingly, the user may be provided with a 3D image on the direction of the user's line of vision in the panorama 3D image.

In response to a user command to magnify or reduce the 3D image being inputted, the processor 130 may control the display 110 to adjust a sense of depth on the 3D image to correspond to the user command and display an image which is magnified or reduced with the adjusted sense of depth. Herein, the magnifying command may include an entirety magnifying command to magnify the entirety of the 3D image and a part magnifying command to magnify a part of the 3D image, and the reducing command may include an entirety reducing command to reduce the entirety of the 3D image and a part reducing command to reduce a part of the 3D image.

The processor 130 may shift the left-eye image and the right-eye image included in the 3D image, may generate a left-eye 3D space image and a right-eye 3D space image by projecting the shifted left-eye image and right-eye image onto the virtual 3D space image, and may extract images corresponding to a user command from the left-eye 3D space image and the right-eye 3D space image and display the images. That is, the processor 130 may shift the left-eye image and the right-eye image to correspond to the user command prior to projecting the left-eye image and the right-eye image onto the virtual 3D space, and then may generate the left-eye 3D space image and the right-eye 3D space image by projecting the shifted left-eye image and right-eye image onto the virtual 3D space.

Specifically, in response to the entirety magnifying command to magnify the entirety of the 3D image being inputted, the processor 130 may shift the left-eye image to the left and shift the right-eye image to the right, may generate the left-eye 3D space image and the right-eye 3D space image by using the left-eye image shifted to the left and the right-eye image shifted to the right, and may extract images corresponding to the entirety magnifying command from the left-eye 3D space image and the right-eye 3D space image and display the images. That is, in response to the entirety magnifying command being inputted, the processor 130 may generate the left-eye 3D space image and the right-eye 3D space image by shifting the left-image and the right-eye image to the right, and may extract magnified images from the left-eye 3D space image and the right-eye 3D space image and display the images.

Specifically, the processor 130 may shift the left-eye image to the left and generate the left-eye 3D space image by using the left-eye image shifted to the left. In addition, the processor 130 may reduce the field of view of the virtual camera existing within the left-eye 3D space image as much as a magnifying ratio on the entirety magnifying command, and may extract the magnified image corresponding to the entirety magnifying command from the left-eye 3D space image using the virtual camera with the reduced field of view. In this case, the processor 130 merely adjusts the field of view of the virtual camera and does not change a focal position of the virtual camera. That is, the processor 130 may maintain the focal position of the virtual camera at the same level as before the entirety magnifying command is inputted, and may extract the magnified image corresponding to the entirety magnifying command from the left-eye 3D space image generated based on the left-eye image shifted to the left. When the left-eye 3D space image is generated based on the left-eye image shifted to the left as described above, the left-eye 3D space image may be in a state in which it is rotated in the counter clockwise direction in comparison to a state before the left-eye image is shifted to the left.

Accordingly, when the magnified image is extracted from the left-eye 3D space image rotated in the counter clockwise direction while the focal position of the virtual camera is maintained as it is, the magnified image may exist closer to the right than when the magnified image is extracted from the left-eye 3D space image without shifting to the left. That is, when the magnified image is extracted by shifting the left-eye image to the left, the magnified image may exist closer to the right when the magnified image is extracted from the left-eye image before being shifted.

The processor 130 may display the magnified image through the display 110. Specifically, the processor 130 may display the magnified image obtained from the left-eye 3D space image on a region viewed by the user's left eye on the display 110. In this case, the processor 130 may adjust the size of the magnified image to have the same size as the image displayed on the display 110 before the entirety magnifying command is inputted, and may display the adjusted image.

However, the above-described operations of processing an image, generating a panorama 3D image, extracting an image according to a motion direction, and extracting an image according to a zoom in/out command may be performed at the server 200, and the user terminal device 100 may be implemented to display only an image received from the server 200. For example, in response to a zoom-in command being inputted to the user terminal device 100, the user terminal device 100 may transmit the corresponding command to the server 200, and the server 200 may provide an image obtained through image processing according to the zoom-in command to the user terminal device 100.

FIG. 4B is a block diagram showing a detailed configuration of the user terminal device illustrated in FIG. 4A. Referring to FIG. 4B, the user terminal device 100' includes the display 110, the communication unit 120, the processor 130, a storage 140, an user interface 150, and a sensor 160. The same elements in FIG. 4B as those illustrated FIG. 4A will not be described in detail.

The storage 140 may store an operating system (O/S) software module for driving the user terminal device 100', and various data such as various multimedia contents.

The user interface 150 may receive various user commands. Specifically, the user interface 150 may receive user commands on various UI screens for controlling the function of the user terminal device 100', which are provided through the display 110. In this case, the user interface 150 may be implemented by using a keypad, a touch pad, or the like provided at one side of the user terminal device 100, but may be provided as a camera for recognizing a motion or a microphone for recognizing a voice according to circumstances.

The sensor 160 may sense a motion state of the user terminal device 100'.

Specifically, the sensor 160 may include a geomagnetic sensor, a gyro sensor, an acceleration sensor, or the like for sensing a motion state. The geomagnetic sensor is a sensor for sensing a rotation state and a moving direction of the user terminal device 100'. The gyro sensor is a sensor for sensing a rotation angle of the user terminal device 100'. Both the geomagnetic sensor and the gyro sensor may be provided, but the rotation state of the user terminal device 100' may be sensed even when only one of them is provided. The acceleration sensor is a sensor for sensing a degree of slope of the user terminal device 100'.

In addition, the sensor 160 may further include a touch sensor, a proximity sensor, or the like for sensing a touch or hovering through a touch pad attached to the device.

In this case, the processor 130 may transmit information corresponding to the motion state sensed by the sensor 160 to the server 200, and may receive a content corresponding to the motion state from the server 200 and display the content through the display 110.

The image processor functions to render the received image and provide it to the display 110.

Since a detailed configuration of the processor 130 illustrated in FIG. 4B is similar to that of the processor 220 of the server 200 illustrated in FIG. 3B, a detailed description thereof is omitted.

Figure 5:
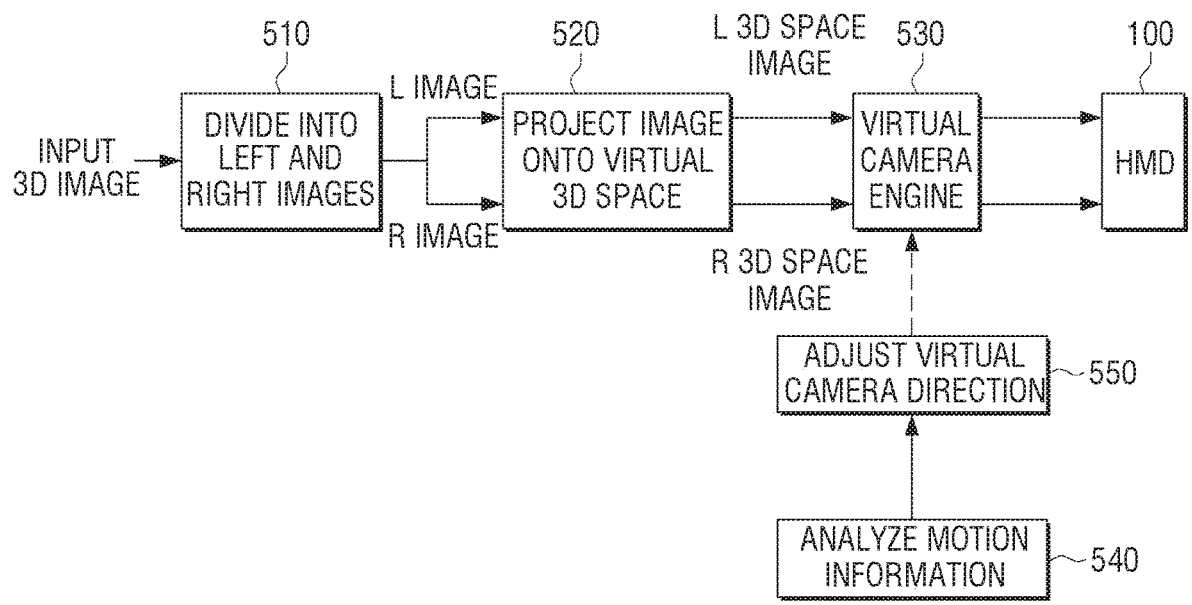
FIG. 5 is a view to illustrate a method for generating and outputting a panorama VR content according to an exemplary embodiment of the present disclosure.

FIG. 5 is a view to illustrate a method for generating and outputting a panorama VR content according to an exemplary embodiment of the present disclosure.

As shown in FIG. 5, in response to a 3D image being inputted from at least one source device 300-1, 300-2, 300-3, the server 200 may divide the 3D image (510), and generates a left-eye 3D image and a right-eye 3D image by projecting the divided images onto a virtual 3D circular space (520). In this case, the generated 3D image may be a panorama VR image, and the panorama VR image may be generated using various VR techniques such as existing 3D-based avatar, and panorama VR and photo object VR, which are based on an object, a scene, and reality.

However, in response to a stereo image in which a left-eye image and a right-eye image are separated being received, the corresponding left-eye and right-eye images may be used as they are, and a 3D image may be generated based on a 2D image according to a 2D-3D conversion technique and may be used. However, a detailed description thereof is omitted.

Thereafter, a desired view point image may be selected through a virtual camera engine and may be transmitted to the user terminal device (for example, an HMD) 100, and the user terminal device 100 may provide the received images as left and right images, thereby providing a 3D VR image In response to changed motion information being received from the user terminal device 100, the server 200 may analyze the received motion information (540) and adjust the direction of the virtual camera based on the analyzed motion information (550), and may extract left and right images of a view point region corresponding to the motion information through the virtual camera engine 530 and transmit the images to the user terminal device 100. That is, on the assumption that there is a virtual camera in the circular 3D space, the server 200 may adjust the direction of the virtual camera in a direction corresponding to the motion of the user terminal device 100, extract an image captured by the virtual camera the direction of which is adjusted from among images mapped onto the circular 3D space, and transmit the image to the user terminal device 100.

Figure 6A:
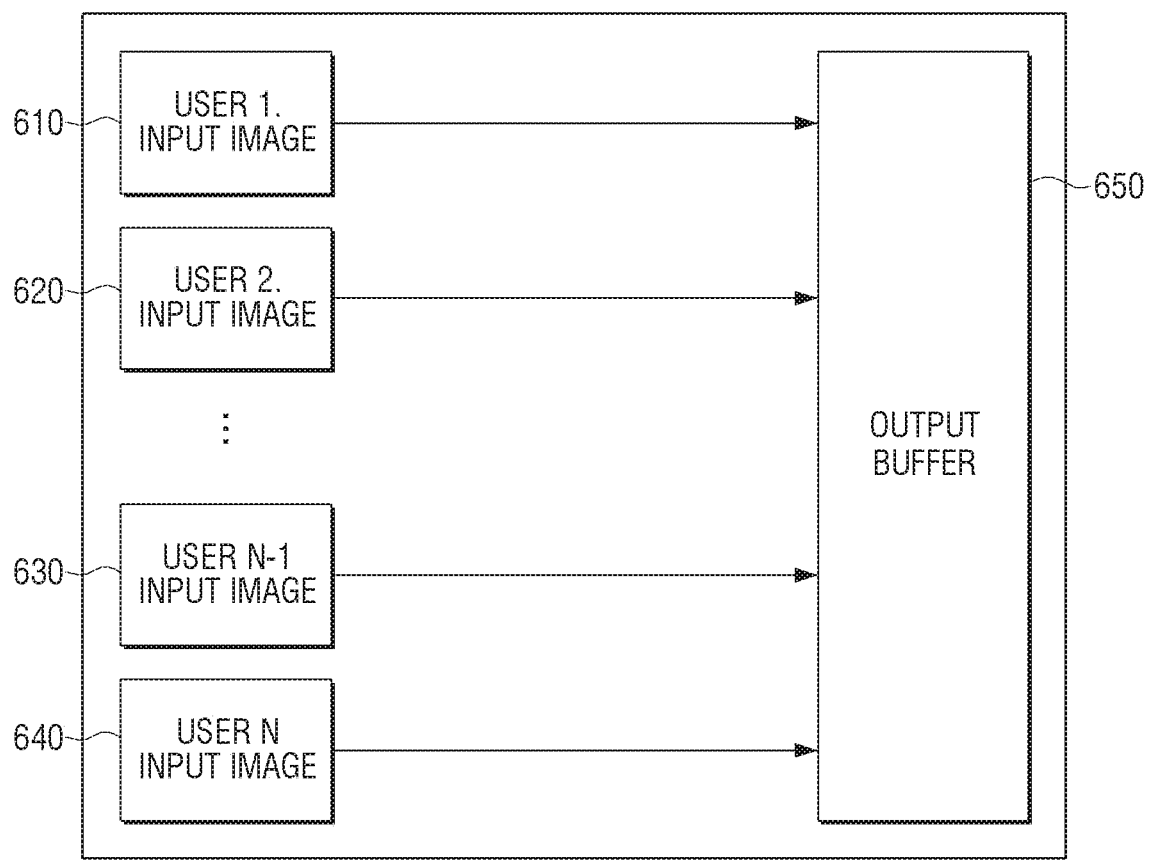
FIGS. 6A and 6B are views to illustrate a method for streaming a content at a server according to an exemplary embodiment of the present disclosure.
Figure 6B:
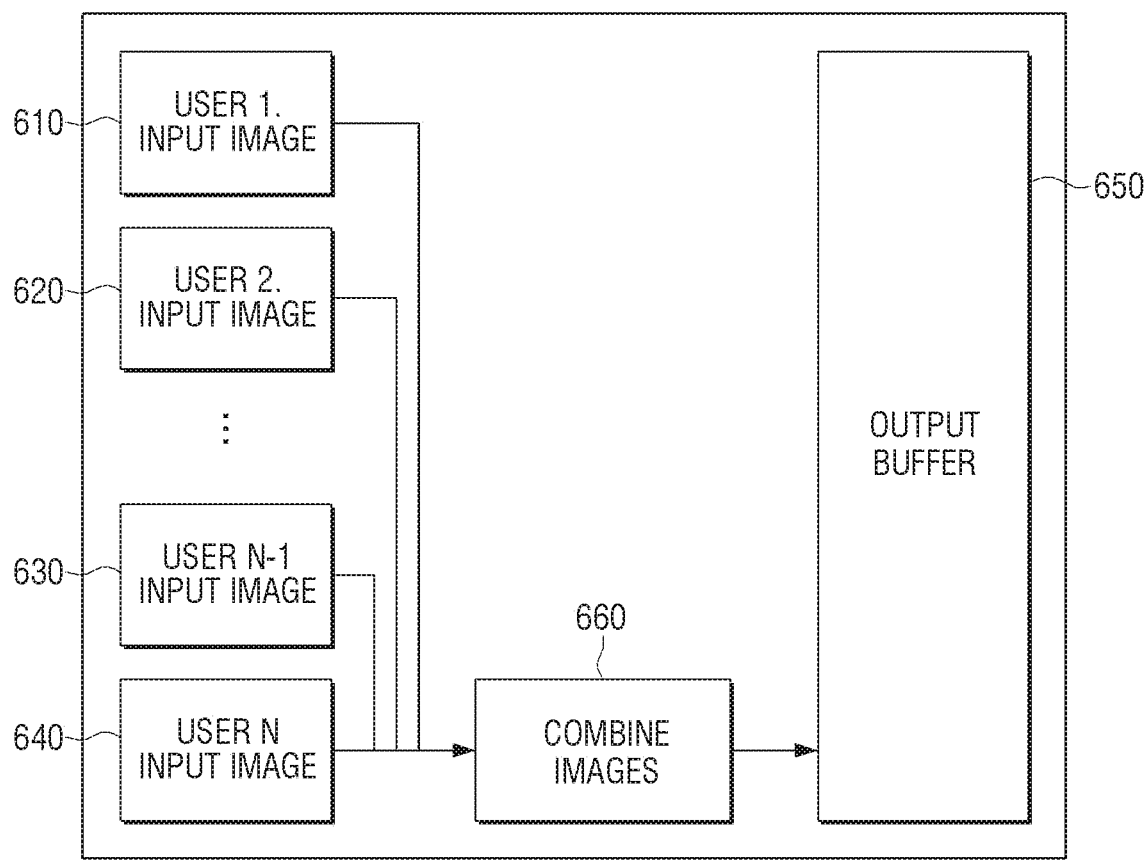

FIGS. 6A and 6B are views to illustrate a method for streaming a content at a server according to an exemplary embodiment of the present disclosure.

Referring to FIG. 6A, in response to a plurality of images 610 to 640 photographed by a plurality of source devices being received, the server 200 may provide these images to an output buffer 650 and individually transmit them to the user terminal device 100. In this case, the output buffer 650 may transmit the plurality of images 610 to 640 to the user terminal device 100 in sequence or simultaneously. Herein, the plurality of images 610 to 640 may be normal 2D moving images, but are not limited thereto, and may include a 3D image including a left-eye image and a right-eye image for providing a VR service, a panorama VR content, a normal 2D image, or the like.

Referring to FIG. 6B, in response to the plurality of images 610 to 640 photographed by the plurality of source devices being received, the server 200 may combine these images (660), provide the combined image to the output buffer 650, and transmit it to the user terminal device 100. In this case, the received plurality of images 610 to 640 may be combined based on location information of the plurality of source devices providing these images.

The sever 200 may process the received images to be suitable for the user terminal device 100 based on content information which varies according to resolution information, display arrangement state, screen size, or the like of the plurality of source devices providing the plurality of images 610 to 640 and the user terminal device 100, and may transmit the processed images to the user terminal device 100, or may combine the processed contents and may transmit the combined content to the user terminal device 100.

Figure 7:
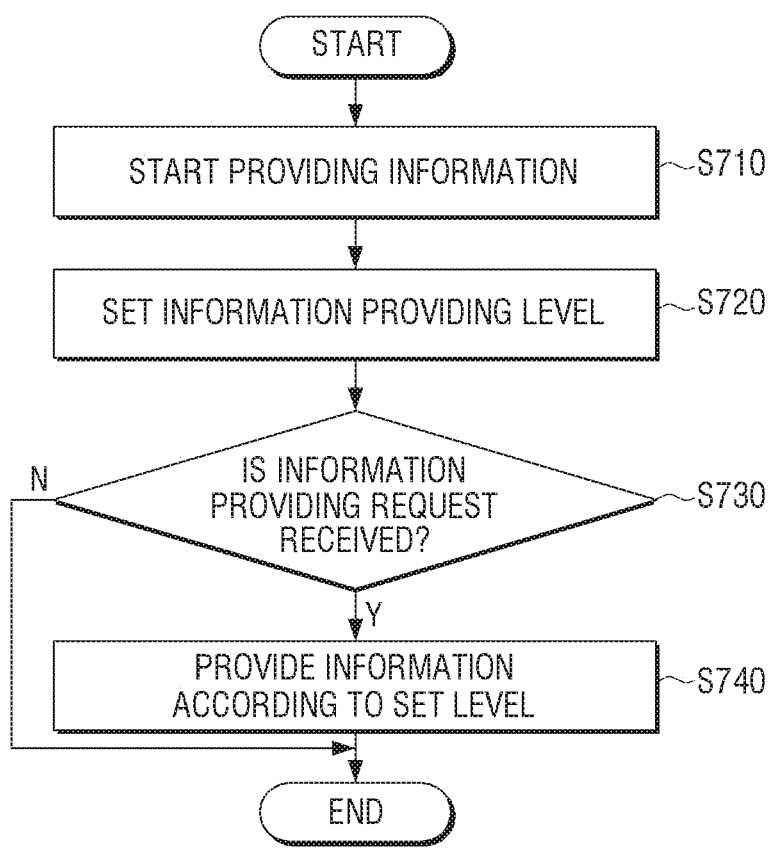
FIG. 7 is a flowchart to illustrate an operation of a source device according to an exemplary embodiment of the present disclosure.

FIG. 7 is a flowchart to illustrate an operation of a source device according to an exemplary embodiment of the present disclosure.

According to the flowchart illustrated in FIG. 7, the source device 300-1, 300-2, 300-3 starts providing information according to a predetermined event (S711). Herein, the predetermined event may include various events in which the source device starts providing information to a third party, such as an event in which an application for providing a corresponding service is installed/driven, an event in which a user subscribes to a corresponding service, or the like.

In response to the source device 300-1, 300-2, 300-3 starting providing information, the user of the source device 300-1, 300-2, 300-3 may request access to the server 200 and set an information providing level (S720). For example, the user may set an information sharing level with a third party regarding audio data, video data, location information, or whether a message is received.

Next, in response to an information providing request being received from the server 200 (S730: Y), the source device transmits corresponding information to the server 200 according to the information providing level set in step S720 (S740).

Figure 8:
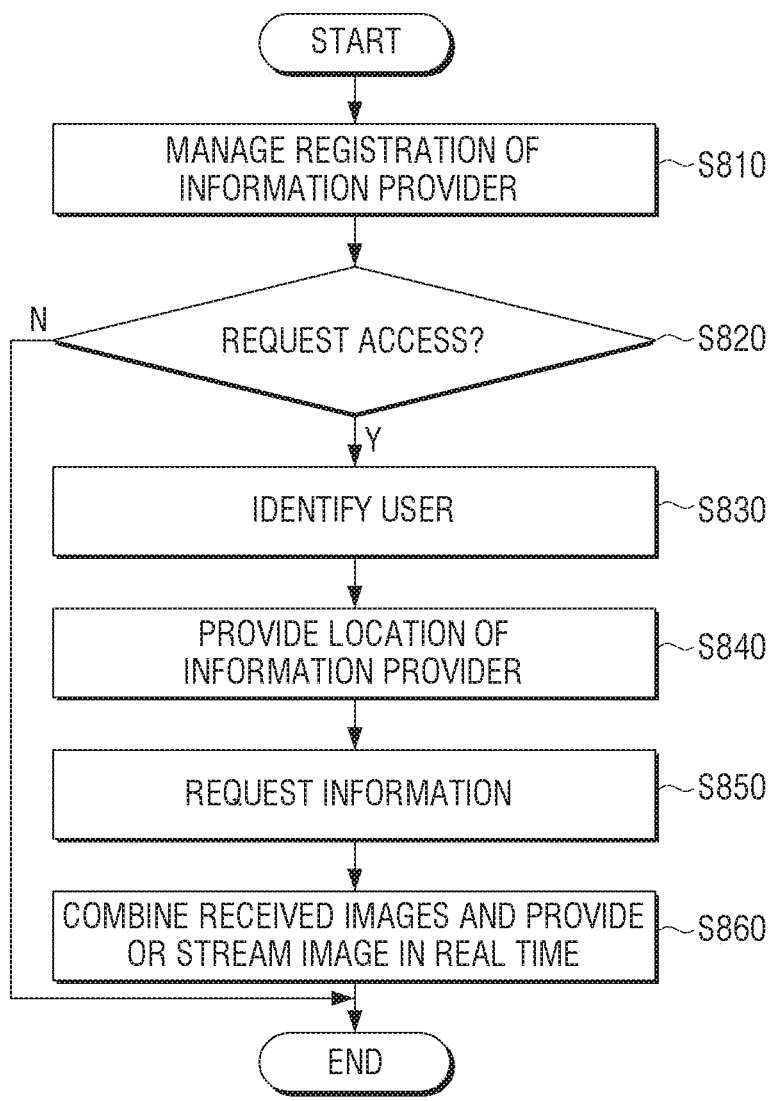
FIG. 8 is a sequence diagram to illustrate an operation of a server according to an exemplary embodiment of the present disclosure.

FIG. 8 is a sequence diagram to illustrate an operation of a server according to an exemplary embodiment of the present disclosure.

According to the flowchart illustrated in FIG. 8, the server 200 may register/manage an information provider according to a predetermined event. For example, in response to the user of the source device 300-1, 300-2, 300-3 subscribing to a corresponding service, the server 200 may register and manage the subscribed user of the source device 300-1, 300-2, 300-3. In this case, the server 200 may manage the information providing level set by the user of the source device 300-1, 300-2, 300-3 according to each user.

Next, in response to there being an access request from the user terminal device 100 (S820: Y), the server 200 identifies the user of the user terminal device 100 which requests the access (S830). For example, the server 200 may determine whether the corresponding user has subscribed to a service provided by the server 200. In this case, the server 200 may determine whether the user has subscribed to the service provided by the server 200 through user authentication information (for example, an ID, a password, or the like) as well as device information (for example, device identification information of the user terminal device). However, since one device may be used by many users, it is preferable to identify the user through the user authentication information.

In response to the user of the user terminal device 100 being identified in step S830, the server 200 may provide an information provider, that is, the location of the source device 300-1, 300-2, 300-3, to the user terminal device 100 (S840). In this case, the server 200 may provide the location of an information provider located at a place set by the user terminal device 100. For example, in response to the user of the user terminal device 100 requesting information on the vicinity of the Gangnam station, the server 200 may provide the location of the source device 300-1, 300-2, 300-3 owned by an information provider located in the vicinity of the Gangnam station to the user terminal device 100. In this case, the server 200 may also provide an image displaying the location of the information provider (for example, a map image), but may provide only the location information of the information provider.

Next, in response to a request for information on at least one specific location being received from the user terminal device 100 (S850), the server 100 transmits an image received from the source device of the corresponding location to the user terminal device 100 (S860). In this case, the server 200 may buffer the received image, combine the image and provide it, or may stream the image in real time.

Figure 9:
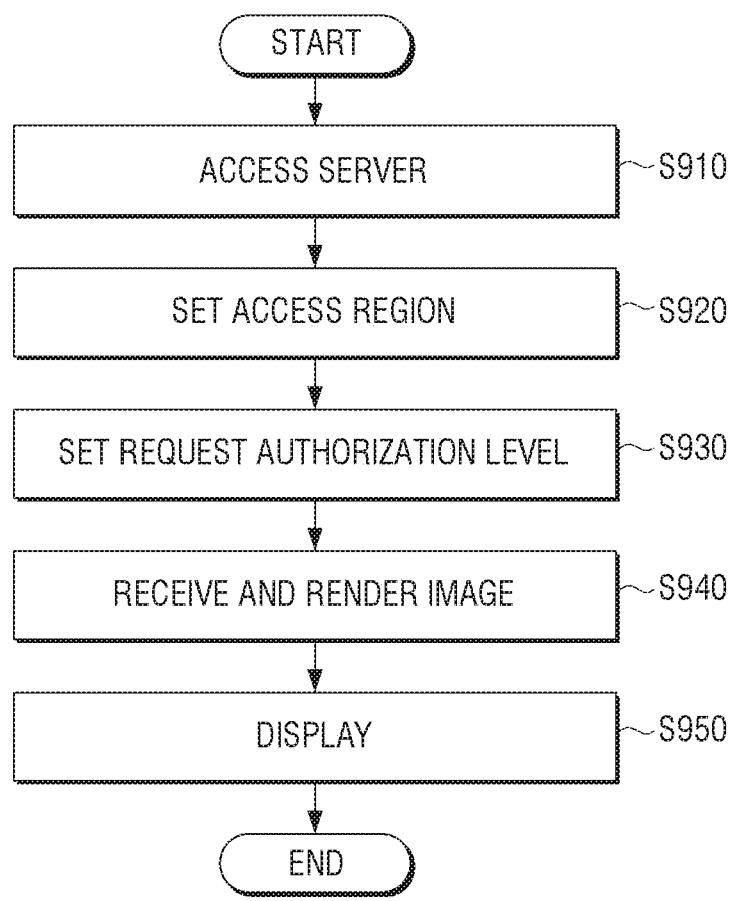
FIG. 9 is a sequence diagram to illustrate an operation of a user terminal device according to an exemplary embodiment of the present disclosure.

FIG. 9 is a sequence diagram to illustrate an operation of a user terminal device according to an exemplary embodiment of the present disclosure.

According to the flowchart illustrated in FIG. 9, the user terminal device 100 accesses the server 200 providing a virtual experience service (S910), and sets an area to access (S920).

Next, the user terminal device 100 sets an information request authority level (S930). For example, the user terminal device 100 may set the information request authority level indicating whether it wishes to receive audio data and video data, wishes to receive only video data, or wishes to transmit a message to an information provider.

Thereafter, the user terminal device 100 may receive information of the requested level, for example, an image, from the server 200, and render the information (S940). In this case, in response to the information of the level requested by the user terminal device 100 being higher than the information providing level of the information provider, that is, the source device 300-1, 300-2, 300-3, the information may be provided within the information providing level of the corresponding source device 300-1, 300-2, 300-3. For example, in response to the user terminal device 100 requesting video and audio from the first source device 300-1, but the information providing level of the first source device 300-1 being set as only video, the server 200 may transmit only the video to the user terminal device 100.

Thereafter, the user terminal device 100 displays the rendered image (S950). That is, when the user terminal device 100 is implemented by using an HMD, the user of the user terminal device 100 may receive a real-time image of a specific place through the displayed image and experience virtual reality.

Figure 10:
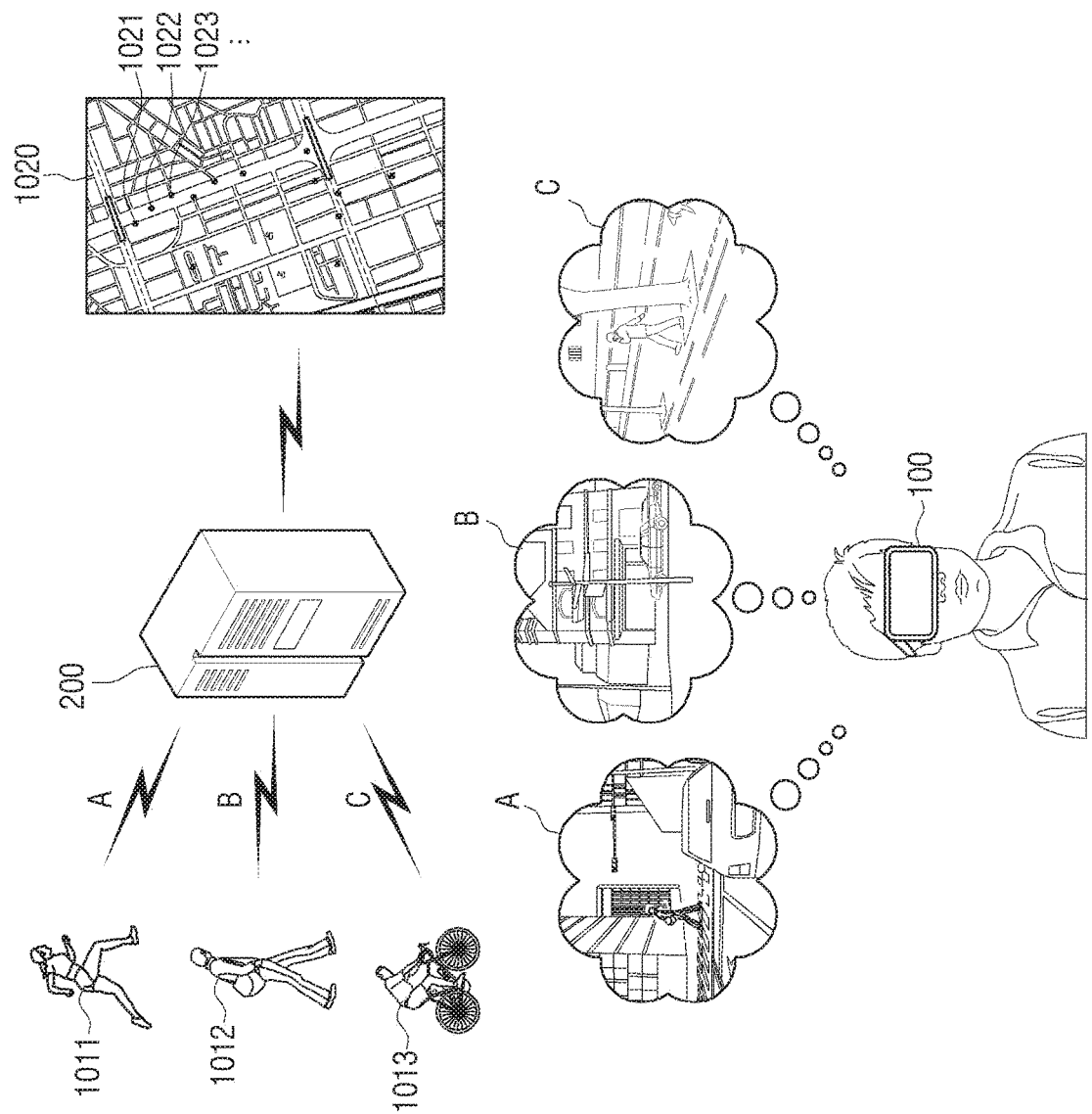
FIGS. 10 to 12 are views to illustrate a virtual experience service providing method according to various exemplary embodiments of the present disclosure.
Figure 11:
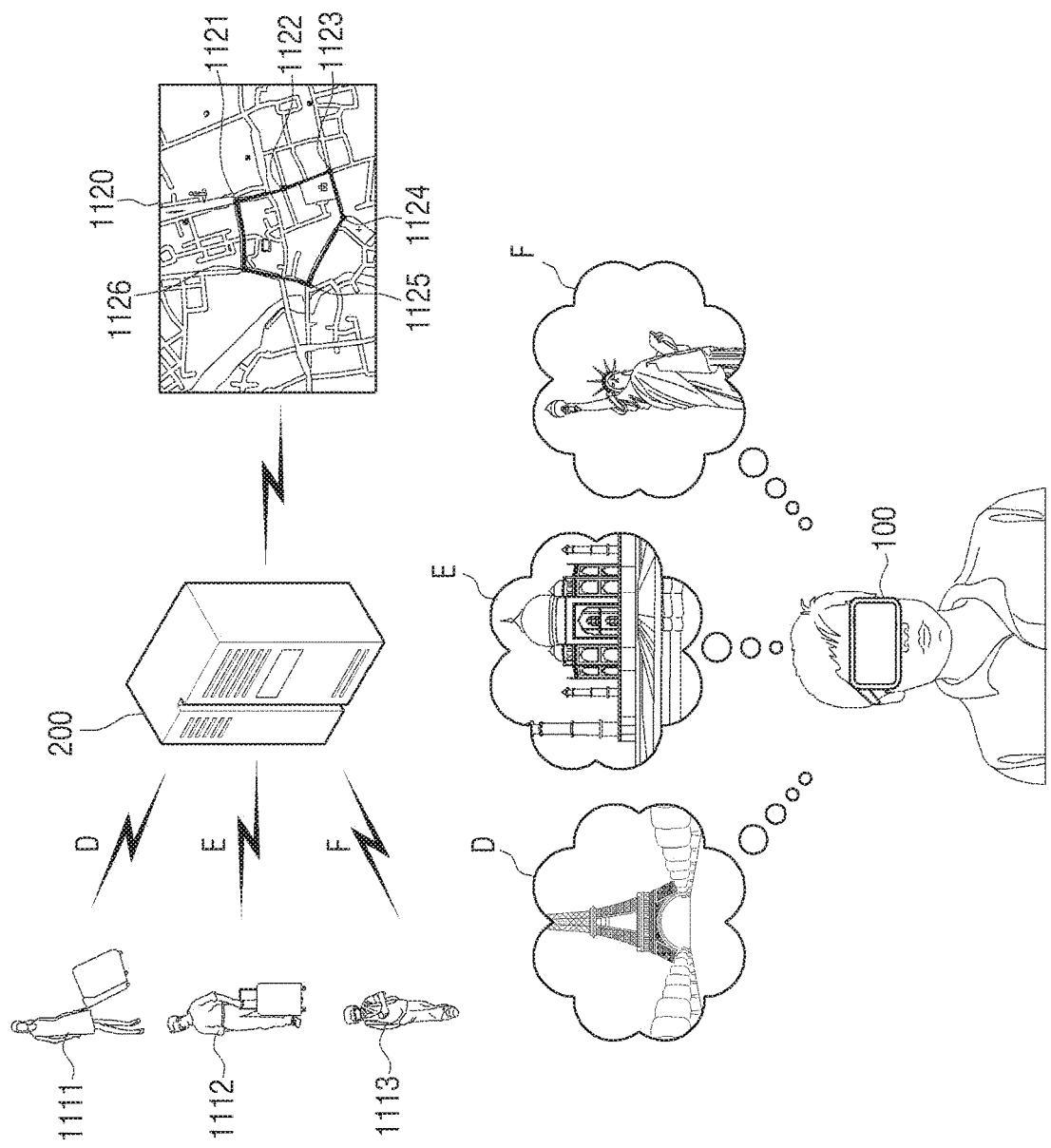
Figure 12:
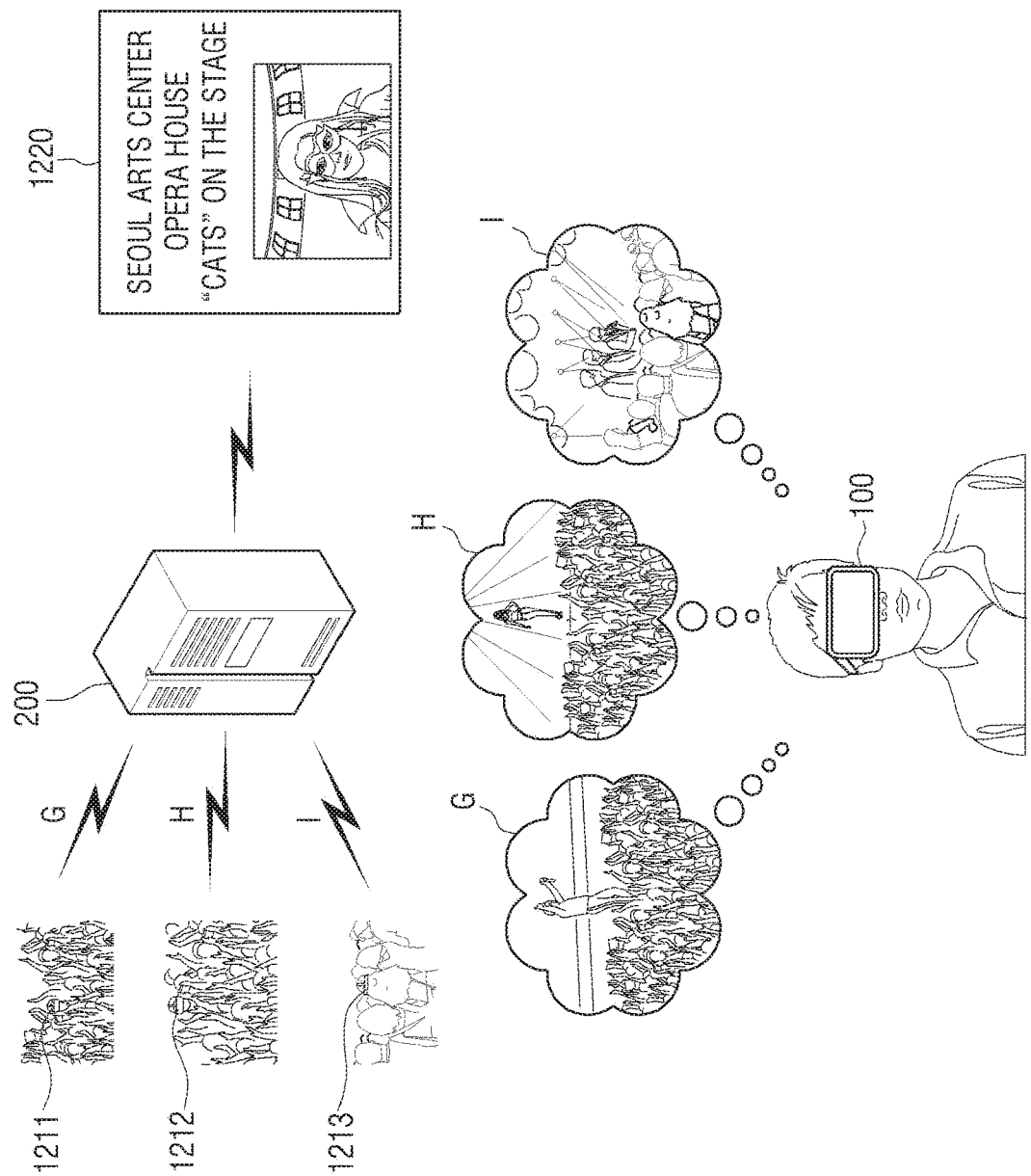

FIGS. 10 to 12 are views to illustrate a method for providing a virtual experience service according to various embodiments of the present disclosure.

As shown in FIGS. 10 to 12, by receiving an image of a specific place from an external user using a source device, that is, a wearable device, the user of the user terminal device 100, that is, the HMD, may be allowed to receive a service of sharing an image provided in the view of another user. In this case, the user of the wearable device may set a content sharing level by setting authority of the user's own device. For example, the content sharing level may be set to a level in which only an image is shared through a camera, a level in which only sound information is shared through a microphone, a level in which both an image and a sound are shared, a level in which neither an image nor a sound is shared, a level in which authority to allow a visitor to input a text message or voice information is provided separately from each sharing level.

FIG. 10 is a view to illustrate a method for providing a virtual road experience service according to an exemplary embodiment of the present disclosure.

As shown in FIG. 10, in response to the user of the HMD selecting an area to receive a virtual road experience service, a UI screen 1020 displaying locations 1021, 1022, 1023, . . . of a plurality of users 1011, 1012, 1013, . . . having wearable devices of the selected area may be provided. In this case, content sharing levels set by the users of the wearable devices may also be displayed. In this case, the HMD user may share an image A, B, C, . . . of a user of a corresponding wearable devices through the server 200 by selecting a user corresponding to a desired sharing level and a desired location.

Alternatively, the HMD user may predict a virtual real-time path condition by searching a location of a user close to a target path by interlocking with a path finding function and receiving photographed images and sounds of the users of the wearable devices 1011, 1012, 1013, . . . located along the path in sequence. In this case, when a distance between the users of the wearable devices located along the path is greater than or equal to a predetermined range, the user of the HMD may be provided with data such as a pre-stored street view, instead of sharing views of the users of the wearable device.

FIG. 11 is a view to illustrate a method for providing a virtual tour service according to an exemplary embodiment of the present disclosure.

As shown in FIG. 11, in response to the user of the HMD selecting an area to receive a virtual tour service, a UI screen 1120 displaying locations 1121, 1122, 1123, . . . of a plurality of users 1111, 1112, 1113, . . . having wearable devices of the selected area may be provided. In this case, content sharing levels set by the users of the wearable devices may also be displayed. In this case, the HMD user may share an image of a user of a corresponding wearable device through the server 200 by selecting a user corresponding to a desired sharing level and a desired location.

FIG. 12 is a view to illustrate a method for providing a virtual event experience service according to an exemplary embodiment of the present disclosure.

As shown in FIG. 12, in response to the user of the HMD selecting a performance to receive a virtual performance experience service through a corresponding UI screen 1220, the user may share performance images received from a plurality of users having wearable devices in the selected performance hall. According to circumstances, a UI screen displaying locations of a plurality of users which can share contents in the performance hall may be provided. In this case, content sharing levels set by the users of the wearable devices may also be displayed. Accordingly, the user of the HMD may selectively share an image photographed at a seat desired by the user in the performance hall.

Alternatively, audio information may be obtained from the closest user to the performance location from among the users of the plurality of wearable devices in the performance hall, and video information may be provided by collecting/combining video information of the respective users and changing a view point between the users according to a user's input.

Figure 13A:
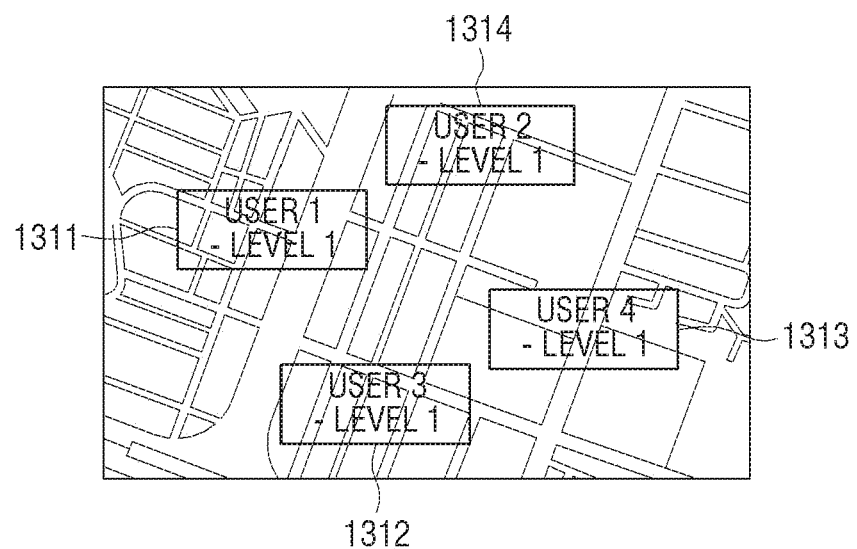
FIGS. 13A and 13B are views showing an implementation example of a UI screen provided in a user terminal device according to an exemplary embodiment of the present disclosure.
Figure 13B:
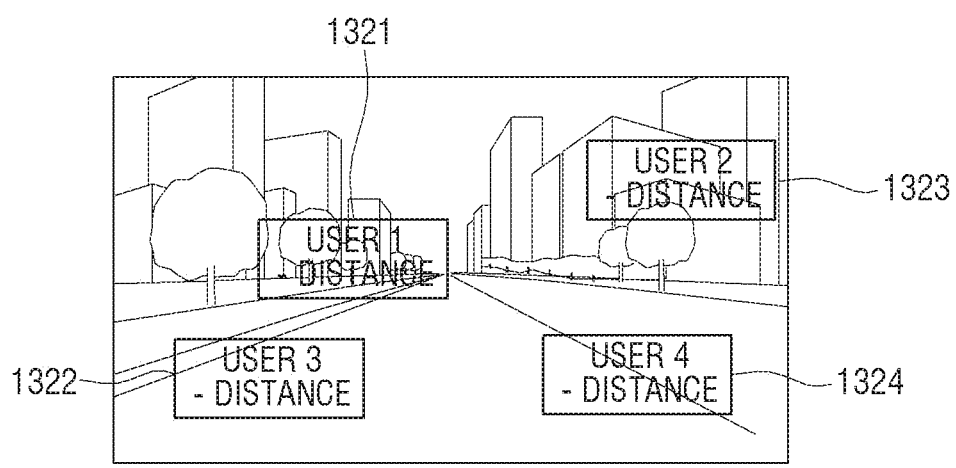

FIGS. 13A and 13B are views illustrating an implementation example of a UI screen provided at a user terminal device according to an exemplary embodiment of the present disclosure.

As shown in FIG. 13A, in response to a user command to set a predetermined area being inputted, the user terminal device 100 may transmit information related to the corresponding area to the server 200, receive location information of at least one source device located in the predetermined area from the server 200, and display a UI screen displaying locations 1311 to 1314 of the at least one source device. In this case, as shown in the drawing, the user terminal device 100 may receive authority information on a content sharing level of a content which is set by the at least one source device to be able to be shared with the user terminal device 100 from the server 200, and may display it together.

As shown in FIG. 13B, it is possible to display locations 1321 to 1324 of users of source devices with which an image can be shared within a current range of line of vision by applying AR technology to a displayed image at a current virtual experience location. In this case, distance information to a user of a corresponding source device may be additionally displayed as shown in the drawing.

The user of the user terminal device 100 may transmit a content transmission request on a specific location to the server 200 through a command to select a source device with which the user wishes to share a photographed image based on information displayed on the UI screen as shown in FIGS. 13A and 13B.

Figure 14:
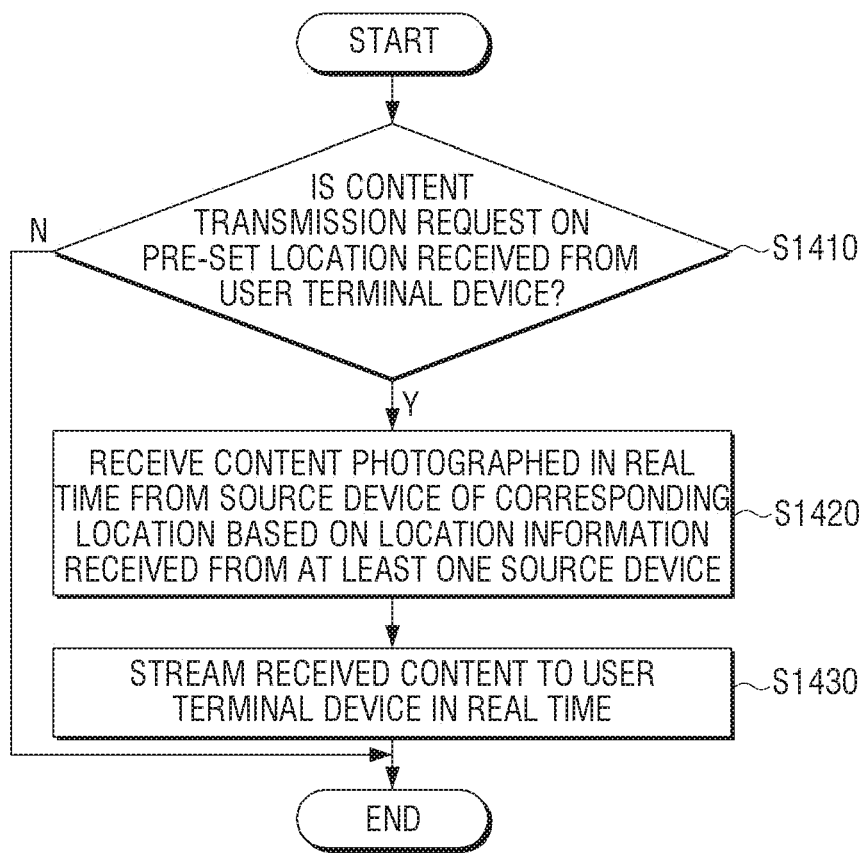
FIG. 14 is a flowchart to illustrate a control method of a server according to an exemplary embodiment of the present disclosure.

FIG. 14 is a flowchart to illustrate a control method of a server according to an exemplary embodiment of the present disclosure.

According to the control method of the server illustrated in FIG. 14, in response to a content transmission request on a predetermined location being received from the user terminal device (S1410: Y), the server receives a photographed content from a source device of the predetermined location in real time based on location information received from at least one source device (S1420).

Next, the received content is provided to the user terminal device in the form of streaming (S1430).

In the step S1430 of providing the received content to the user terminal device in the form of streaming, a plurality of photographed contents received from a plurality of source devices may be transmitted to the user terminal device in sequence based on location information received from the plurality of source devices, or the plurality of photographed contents received from the plurality of source devices may be combined based on the location information received from the plurality of source devices, and a combined content may be transmitted to the user terminal device.

In addition, in the step S1430 of providing the received content to the user terminal device in the form of streaming, based on authority information on a content sharing level of a content that is set by at least one source device to be able to be shared with the user terminal device, a content corresponding to corresponding authority information may be selected from among contents received from the source devices, and may be transmitted to the user terminal device.

In addition, in the step S1430 of providing the received content to the user terminal device in the form of streaming, the content received from the source device may be processed according to a predetermined condition set at the user terminal device, and may be transmitted the user terminal device.

In addition, the control method may further include, in response to the content received from the source device being a 3D content, generating a left-eye 3D space image and a right-eye 3D space image by projecting a left-eye image and a right-eye image included in the 3D content onto a virtual 3D space, and, in response to information corresponding to a motion state of the user terminal device being received from the user terminal device, extracting a view point region corresponding to the motion state of the user terminal device from the generated left-eye and right-eye 3D space images, and transmitting an image of the view point region to the user terminal device.

Figure 15:
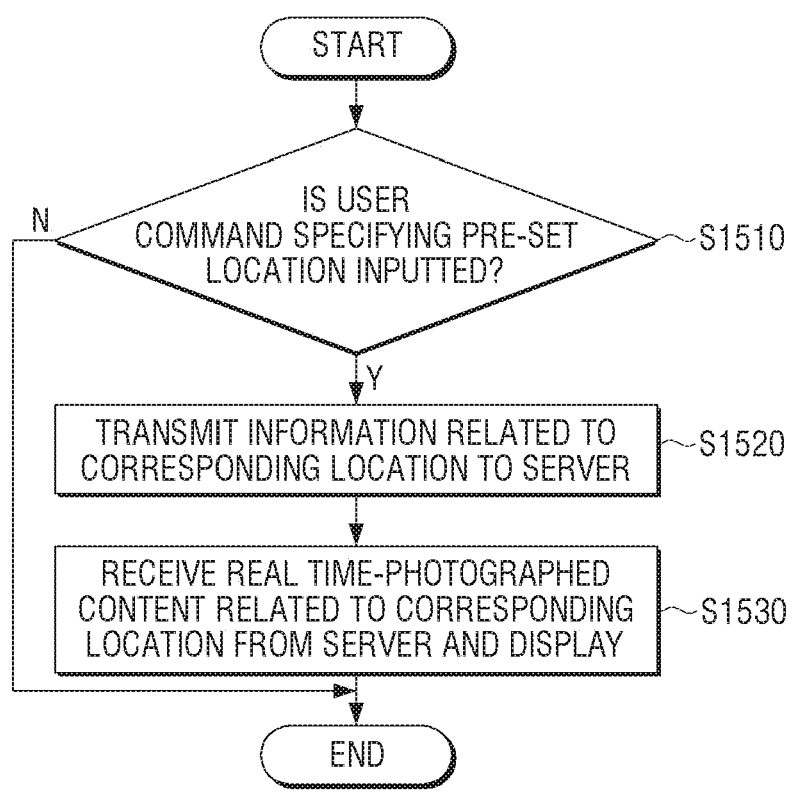
FIG. 15 is a flowchart to illustrate a control method of a user terminal device according to an exemplary embodiment of the present disclosure.

FIG. 15 is a flowchart showing a control method of a user terminal device according to an exemplary embodiment of the present disclosure.

According to the control method of the user terminal device illustrated in FIG. 15, in response to a user command to specify a predetermined location being inputted (S1510: Y), the user terminal device transmits information related to the corresponding location the server (S1520).

Thereafter, the user terminal device receives a real-time photographed content related to the corresponding location from the server and display the content through a display (S1530).

In the step of S1530 of receiving and displaying the content, the user terminal device may receive only a content selected at the server based on authority information regarding a content sharing level of a content that is set by at least one source device providing the real-time photographed content to be able to be shared with the user terminal device. However, according to circumstances, the source device may transmit only a content selected based on the authority information to the server.

In addition, in the steps S1510, S1520, and S1530, in response to a user command to set a first point and a second point on a UI screen being inputted, the user terminal device may transmit information corresponding to a predetermined path connecting the first point and the second point to the server, and receive a plurality of contents related to the predetermined path from the server and display the plurality of contents, or receive a combined content in which a plurality of contents related to the predetermined path are combined from the server and display the combined content.

In addition, the control method may further include, in response to a user command to set a predetermined area being inputted, transmitting information related to the corresponding area to the server, and receiving location information of at least one source device located in the predetermined area from the server and displaying a GUI indicating the location of the at least one source device.

In this case, the user terminal device may receive authority information regarding a content sharing level of a content that the at least one source device is able to share with the user terminal device from the server, and display the authority information on a region adjacent to a GUI indicating the location of the source device.

In addition, in the steps S1510, S1520, and S1530, in response to a user command to specify the predetermined location on a UI screen providing a virtual experience service being inputted, the user terminal device may transmit information related to the corresponding location to the server, and receive a virtual experience content photographed at the corresponding location from the server and display the virtual experience content. Herein, the virtual experience service may include at least one of a virtual road experience service, a virtual tour service, and a virtual event experience service.

According to various embodiments of the present disclosure as described above, a user can experience a sense of realism of a remote place using information obtained through wearable devices of others. In addition, a service for directly or indirectly paying a user of a wearable device located at a remote place may be provided.

The methods according to various exemplary embodiments may be programmed and stored in various storage media. Accordingly, the methods according to various exemplary embodiments as described above may be implemented in various types of electronic devices executing storage media.

Specifically, according to an exemplary embodiment of the present disclosure, there is provided a non-transitory computer readable medium which stores a program sequentially performing the steps of: receiving a content transmission request on a predetermined location from the user terminal device; and receiving a real-time photographed content from a source device of the predetermined location based on location information received from at least one source device, and providing the content to the user terminal device in the form of streaming.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

While preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A server for providing a content to an electronic device, the server comprising:
    a transceiver; and
    one or more processors configured to:
        obtain, from a plurality of source devices through the transceiver, location information for locations of the plurality of source devices and authority information for sharing level of content set by the plurality of source devices,
        obtain, from the electronic device through the transceiver, a request for content for a specific place,
        in response to the request for content for the specific place, obtain a plurality of contents obtained in real time by the plurality of source devices located in the specific place from among the plurality of source devices, based on the obtained location information of the plurality of source devices,
        identify a plurality of portions from among the plurality of contents based on the obtained authority information of the source devices located in the specific place, wherein the authority information indicates whether to share only the portion of the content with other devices including the electronic device,
        obtain a virtual space by mapping the plurality of portions based on the obtained location information of the plurality of source devices,
        obtain a virtual camera in the virtual space through a VR engine, and
        transmit an image of the virtual space projected by the virtual camera based on a direction viewed by a user of the electronic device to the electronic device through the transceiver,
    wherein each of the plurality of contents comprises video data and audio data, and each of the plurality of portions is video data,
    wherein the one or more processors are further configured to decode only a margin region in a region corresponding to a future motion state of the electronic device except for a previously transmitted image and transmit the decoded image to the electronic device,
    wherein the one or more processors are further configured to, based on motion information received from a plurality of electronic devices including the electronic device being within a predetermined threshold range, group the plurality of electronic devices into one group, and transmit the image to the plurality of electronic devices,
    wherein the one or more processors are further configured to, based on a start point and an arrival point in the virtual space being received from the electronic device, obtain an optimal path, obtain background images from the start point to the arrival point according to the obtained path and transmit the background images to the electronic device sequentially,
    wherein the one or more processors are further configured to provide a car mode, a walking mode, and a running mode, and
    wherein the one or more processors are further configured to obtain audio data from one source device from among the plurality of source devices and obtain video data from the plurality of source devices.

2. A control method of a server for providing a content to an electronic device, the control method comprising:
    obtaining, from a plurality of source devices, location information for locations of the plurality of source devices and authority information for sharing level of content set by the plurality of source devices;
    obtaining, from the electronic device, a request for content for a specific place;
    in response to the request for content for the specific place, obtaining a plurality of contents obtained in real time by the plurality of source devices located in the specific place from among the plurality of source devices, based on the obtained location information of the plurality of source devices;
    identifying a plurality of portions from among the plurality of contents based on the obtained authority information of the source devices located in the specific place, wherein the authority information indicates whether to share only the portion of the content with other devices including the electronic device;
    obtaining a virtual space by mapping the plurality of portions based on the obtained location information of the plurality of source devices;
    obtaining a virtual camera in the virtual space through a VR engine; and
    transmitting an image of the virtual space projected by the virtual camera based on a direction viewed by a user of the electronic device to the electronic device,
    wherein each of the plurality of contents comprises video data and audio data, and each of the plurality of portions is video data,
    wherein the transmitting comprises:
        decoding only a margin region in a region corresponding to a future motion state of the electronic device except for a previously transmitted image, and
        transmitting the decoded image to the electronic device,
    wherein the transmitting comprises:
        based on motion information received from a plurality of electronic devices including the electronic device being within a predetermined threshold range, grouping the plurality of electronic devices into one group, and
        transmitting the image to the plurality of electronic devices, wherein the transmitting comprises:
        based on a start point and an arrival point in the virtual space being received from the electronic device, obtaining an optimal path, obtaining background images from the start point to the arrival point according to the obtained path, and
        transmitting the background images to the electronic device sequentially, wherein the server provides a car mode, a walking mode, and a running mode, and wherein the obtaining the plurality of contents comprises obtaining audio data from one source device from among the plurality of source devices and obtaining video data from the plurality of source devices.

\* \* \* \* \*